United States Patent
Winter et al.

(10) Patent No.: US 7,783,724 B2
(45) Date of Patent: Aug. 24, 2010

(54) SYSTEM AND METHOD FOR DELIVERING BUSINESS INTELLIGENCE DATA IN A CLIENT/SERVER ARCHITECTURE

(75) Inventors: Stewart Winter, Metcalfe (CA); Andrew Leikucs, Ottawa (CA); Randy Westman, Ottawa (CA); Murray Reid, Munster (CA); Todd MacCulloch, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 11/473,915

(22) Filed: Jun. 23, 2006

(65) Prior Publication Data

US 2007/0299937 A1    Dec. 27, 2007

(51) Int. Cl.
*G06F 13/00* (2006.01)
*G06F 9/44* (2006.01)

(52) U.S. Cl. .................. 709/219; 719/328; 717/100; 717/104; 717/116; 717/120; 717/131

(58) Field of Classification Search ............. 709/219; 719/328; 717/100, 104, 116, 120, 131, 165
See application file for complete search history.

(56) References Cited

U.S. PATENT DOCUMENTS

| 7,487,201 | B1 * | 2/2009 | Murray et al. ............... 709/201 |
| 2007/0118844 | A1 * | 5/2007 | Huang et al. ................ 719/330 |
| 2007/0174419 | A1 * | 7/2007 | O'Connell et al. .......... 709/217 |

OTHER PUBLICATIONS

Jesse James Garrett, "Ajax: A New Approach to Web Applications", Adaptive Path, LLC, Feb. 18, 2005, pp. 1-6.

* cited by examiner

*Primary Examiner*—Krisna Lim
(74) *Attorney, Agent, or Firm*—Shumaker & Sieffert, P.A.

(57) ABSTRACT

A business intelligence analysis client system is used with a business intelligence analysis sever system having an object model representing one or more data sources. The client system maintains a business intelligence analysis client copy of the object model that is maintained by the server system. The client system obtains from the server system a result of the user request including update information, and updates the client copy of the object model according to the update information. The client system presents the result of the user request based on the updated client copy of the object model.

22 Claims, 6 Drawing Sheets

SYSTEM AND METHOD FOR DELIVERING BUSINESS INTELLIGENCE DATA IN A CLIENT/SERVER ARCHITECTURE

FIELD OF THE INVENTION

The present invention relates to a system and method for delivering business intelligence data in a client/server architecture.

BACKGROUND OF THE INVENTION

In the Business Intelligence (business intelligence) computer applications domain, business decision makers use analytical software tool to pose operational performance questions as queries against their data sources. The analytical tool is often implemented in server-client environments. The analytical tool has a client part that handles user interfaces, and a server part that handles processing of queries and retrieval of data from data sources.

In order to analyze business performance, users often need to navigate through data in reports generated by the analytical tool. Each gesture of the user results in a new page being sent to the client from the server and rendered in the browser. This causes significant interactions between the client and server. Such high interactions between the client and server may cause undue delay in providing requested information or actions to the client and users may not be able to perform sufficient business performance analysis.

It is therefore desirable to provide a mechanism for providing business intelligence information and actions to the client more efficiently.

SUMMARY OF THE INVENTION

It is an object of the invention to provide an improved system and method for delivering business intelligence data in a client/server architecture.

The invention according to an aspect provides an analysis client system that maintains a client copy of an object model used by a server.

The invention according to another aspect provides a client server application program interface (API) for sharing a common business intelligence object model between a business intelligence client and a business intelligence server.

In accordance with an aspect of the present invention, there is provided a business intelligence analysis client system for use with a business intelligence analysis sever system having an object model representing one or more data sources. The business intelligence analysis client system comprises a user interaction module, an object model module, and a communication module. The user interaction module is provided for managing interaction with a user for receiving user requests and presenting results of the requests. The object model module is provided for managing a client copy of the object model of the analysis server system. The communication module is provided for managing communication with the analysis server system for obtaining update information for updating the client copy of the object model.

In accordance with another aspect of the present invention, there is provided a method of processing a user request. The method comprises the steps of receiving a user request; maintaining in an analysis client system a business intelligence analysis client copy of an object model that is maintained by a business intelligence analysis server system to represent one or more data sources; obtaining from the analysis server system a result of the user request including update information for updating the client copy of the object model; updating the client copy of the object model according to the update information; and presenting the result of the user request based on the updated client copy of the object model.

In accordance with another aspect of the present invention, there is provided a client-server user interface comprises a client request holder and a server result holder. The client request holder is provided for holding a client request to a business intelligence server system having an object model representing one or more data sources. The client request is generated by a business intelligence client system having a client copy of the object model. The client request holder has a request portion for holding the client request, a client context portion for holding a client context provided by the client system, and a server context portion for holding a server context provided by the sever system. The server result holder has a result portion for holding a result of the client request, the client context portion and the server context portion for asynchronously sending the result to the client system.

In accordance with another aspect of the present invention, there is provided a computer readable medium storing instructions or statements for use in the execution in a computer of a method of processing a user request. The method comprises the steps of receiving a user request; maintaining in an analysis client system a business intelligence analysis client a copy of an object model that is maintained by a business intelligence analysis server system to represent one or more data sources; obtaining from the analysis server system a result of the user request including update information for updating the client copy of the object model; updating the client copy of the object model according to the update information; and presenting the result of the user request based on the updated client copy of the object model.

In accordance with another aspect of the present invention, there is provided a propagated signal carrier containing computer executable instructions and/or statements that can be read and executed by a computer, the computer executable instructions being used to execute a method of processing a user request. The method comprises the steps of receiving a user request; maintaining in an analysis client system a business intelligence analysis client a copy of an object model that is maintained by a business intelligence analysis server system to represent one or more data sources; obtaining from the analysis server system a result of the user request including update information for updating the client copy of the object model; updating the client copy of the object model according to the update information; and presenting the result of the user request based on the updated client copy of the object model.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Figure 1:
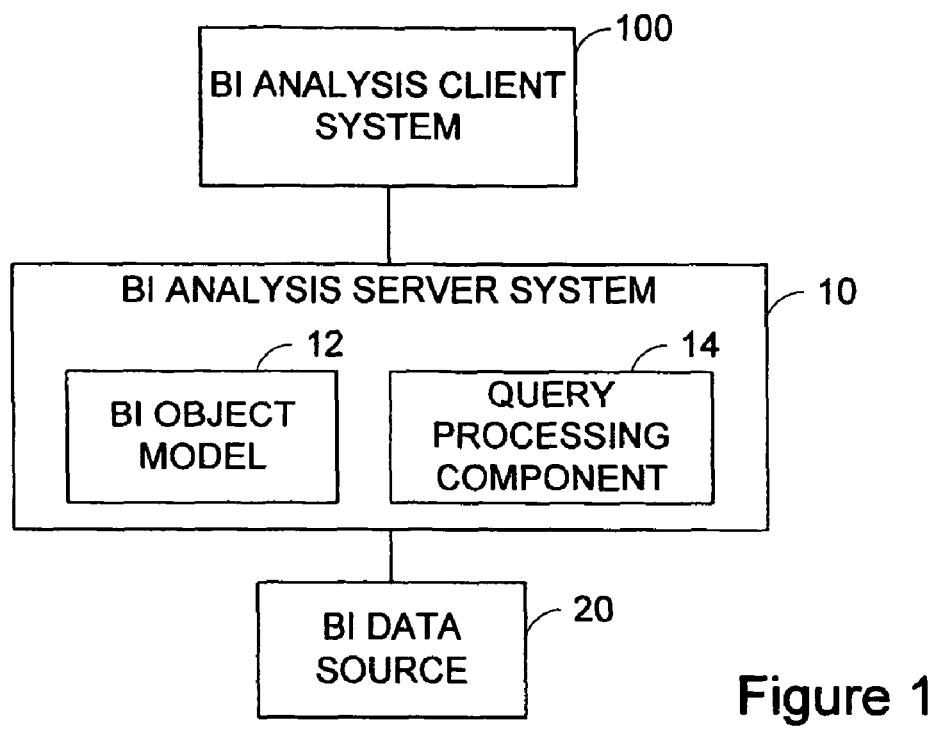
FIG. 1 is a block diagram showing a client/server architecture which uses an analysis client system in accordance with an embodiment of the present invention.
Figure 2:
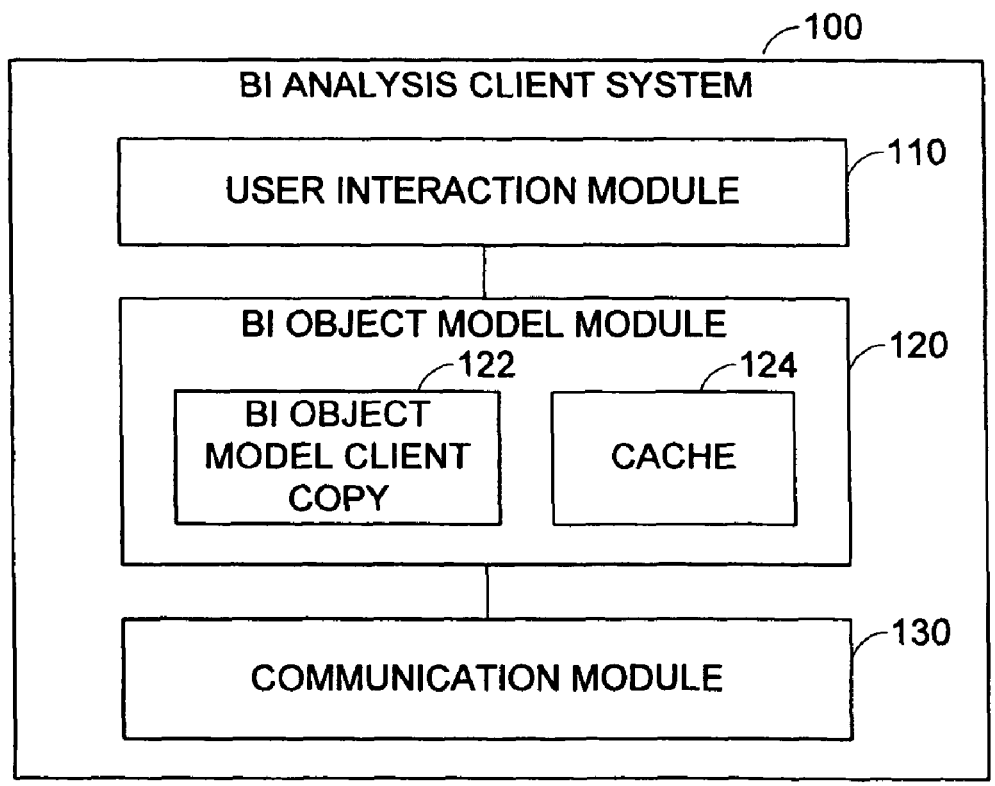
FIG. 2 is a block diagram showing an embodiment of the analysis client system.

Referring to FIGS. 1 and 2, a business intelligence analysis client system 100 in accordance with an embodiment of the invention is described.

The business intelligence analysis client system 100 communicate with a business intelligence analysis server system 10 over a computer network, such as an internet, intranet and/or extranet. The analysis server system 10 has a business intelligence object model 12 and a query processing component 14. The object model 12 represents one or more underlying business intelligence data sources 20 storing business intelligence data. The query processing component 14 processes queries received from the analysis client system 100 and retrieves requested data from the data sources 20 using the object model 12.

As shown in FIG. 2, the analysis client system 100 has a user interaction module 110, a business intelligence object model module 120 and a communication module 130.

The user interaction module 110 manages user gestures through user interfaces, and converts the user gestures to requests comprising discreet commands for the object model module 120. For example, user gestures may be drilling, expanding or nesting data in a crosstab. The user interaction module 110 also manages the rendering of the business intelligence objects for displaying responses to the user gestures.

The user interaction module 110 typically displays only a portion of the data available within the object model module 120, and may maintain a small copy of this data decorated to support efficient user interface activity.

The object model module 120 has a client copy 122 of the object model 12 of the analysis server system 10. The object model client copy 122 stores model objects, which share a common definition with the server. The analysis server system 10 issues to the analysis client system 100 commands to create, delete, replace or update objects in the object model client copy 122. For example, the analysis client system 100 requests high level actions of the analysis server system 10, such as drill/expand/nest of data, and the analysis server system 10 responds with object definitions and commands to modify the objects in the object model client copy 122. Thus, the client 100 and server 10 share a common business intelligence object model.

The object model module 120 also manages a cache 124 of objects. It may perform intelligent look-ahead behaviour.

The communications module 130 manages requests issued to and responses received from the analysis server system 10. The communications module 130 parses responses and directs them to the appropriate objects in the object model client copy 122.

The client system 100 and the server system 10 communicate using an asynchronous protocol. Thus, the responses from the analysis server system 10 arrive asynchronously to the requests issued by the analysis client system 100.

By having the object model client copy 122, the analysis system client 100 maintains state information of the object model 12, and this information need not be round tripped with each client request and server response. This reduces the amount of information exchanged between the client system 100 and the server system 10.

Using the object model client copy 122, the client system 100 and the sever system 10 exchange incremental updates to information about the business intelligence object model. The client system 100 can build up a collection of information over time that it uses to enhance the client experience, both in terms of user interface and responsiveness.

The client system 100 prevents user gestures that will result in unsuccessful results based on the information that the client system 100 has stored and maintained within the object model client copy 122. The client system 100 prevents these gestures by disabling features in the user interface when that gesture will cause the object model to be modified so that it results in an invalid state. The client system 100 disables features by making them inaccessible in the user interface. The client system 100 determines that a feature should be inaccessible based on an examination of the current state of the client copy business intelligence object model 122. Where this model 122 indicates that a feature would result in an invalid model on the server system 10, the feature that would invalidate model is made inaccessible in the client system 100.

Thus, the analysis client system 100 provides a highly interactive client environment supporting business intelligence analytical gestures with the supporting power of a remote business intelligence analysis server system 10.

Figure 3:
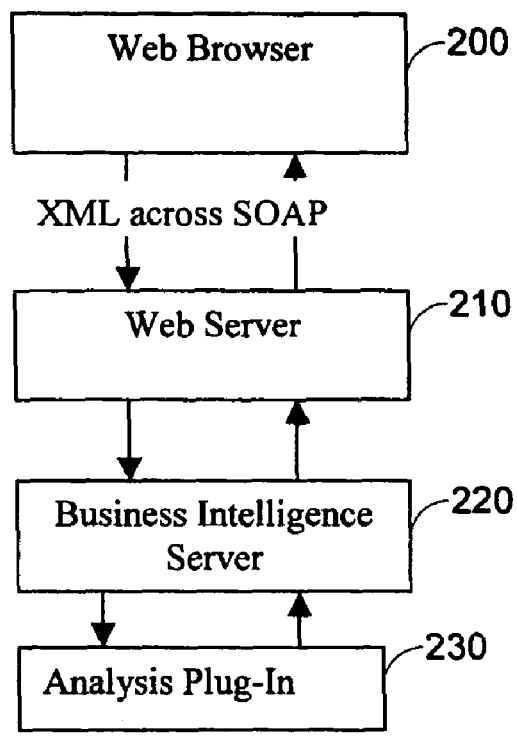
FIG. 3 is a block diagram showing a client/server architecture which uses an analysis client system in accordance with another embodiment of the present invention.
Figure 4:
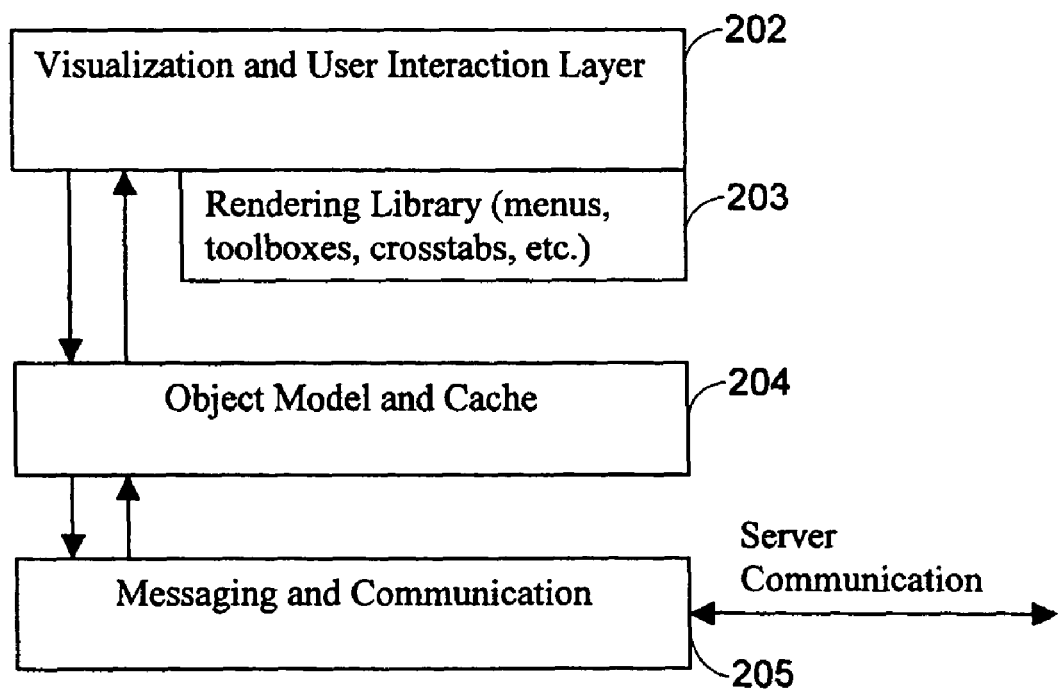
FIG. 4 is a block diagram showing another embodiment of the analysis client system.

Referring to FIGS. 3 and 4, a business intelligence analysis client system 200 in accordance with another embodiment of the invention is described. In this embodiment, the analysis client system 200 is implemented as a web browser based client. The web browser based client 200 is connected to a web server 210, which communicate with a business intelligence server 220 over a computer network, such as an internet, intranet and extranet. The business intelligence server 220 has an analysis plug-in 230 for updating the server copy of the business intelligence object model, processing queries, retrieving data and preparing commands to update the client copy of the common business intelligence object model.

FIG. 4 shows the architecture of the web browser based client 200. The browser client 200 has a visualization and user interaction module or layer 202, an object model and cache module or layer 204 and a messaging and communication module or layer 205. These layers have similar functions as the user interaction module 110, business intelligence object model module 120 and communication module 130 shown in FIG. 2, respectively.

The visualization layer 202 has a rendering library 203 containing rendering elements, such as, menus, toolboxes, and crosstabs.

In this embodiment, the browser based client 220 is written in javascript. The client/server interactions use Extensible Markup Language (XML). The visualization of objects in the client uses Dynamic HTML (DHTML). The object model layer 204 stores and manages the classes of objects, such as DataMatrix, MetadataSet, and FilterSet, which share a common definition with the business intelligence server 230.

The communications layer 206 manages Simple Object Access Protocol (SOAP) requests issued to and received from the business intelligence server analysis plug-in 230 via the web server 210.

An example of the process flow between the components of the web browser based client 200 and the business intelligence server 220 and analysis plug-in 230 is now described.

The visualization and user interaction layer 202 of the browser client 200 captures the user gestures. These gestures are converted to function calls into the object model layer 204. For example, if a user drags a member from the metadata tree to the crosstab, a function call is made to the object model layer 204 indicating that the user is trying to insert a member into the crosstab. Depending on the gesture, the visualization layer 202 may put itself into a wait state and display appropriate feedback to the user indicating that a request is in progress.

The object model layer 204 then takes the function call and converts this to a business intelligence request to the web server 210. This request is formulated as an XML document and handed to the communication layer 205.

The communication layer 205 takes the XML document, wraps this into a SOAP request package, and then issues an HyperText Transfer Protocol (HTTP) request to the web server 210 with this SOAP package. The communication layer 205 asynchronously monitors the progress of the request.

The web server 210 sends the HTTP request to the business intelligence server 220 through the computer network.

The business intelligence server 220 receives the request and hands it to the analysis plug-in 230. The analysis plug-in 230 processes the request, queries the database as required, and creates an XML document containing the response. The XML document result describes updates to the common object model that is shared between the browser client 200 and the business intelligence server 220. FIG. 3 shows the path that the XML document takes to return from the analysis plug in to the client. The details of the result document is described below in the example FIG. 16. Because the browser client 200 allows incremental updates to the model in the object model layer 204, the complete model itself is not exchanged on each request, but only those pieces that are needed or changed.

The communication layer 205 of the browser client 200 receives the HTTP response containing the SOAP response which contains the XML document describing the updates to the model in the object model layer 204. The communication layer 205 hands the XML document to the object model layer 204.

The object model layer 204 processes the XML response and updates the client or local copy of the model in the object model layer 204 with the changes identified by the business intelligence server analysis plug-in 230. The object model layer 204 now notifies the visualization layer 202 about the changes to the objects of the model in the object model layer 204. The visualization layer 202 then completes the request pending state, and retrieves the new information from the object layer 204 and then updates the display, e.g., a tree and crosstab, with the new information retrieved from the server as stored in the object layer 204 of the browser client 200.

Some requests are handled by the object model layer 204 if they can be satisfied by the data stored in the object model cache 204. If the request cannot be satisfied by the object model layer 204, the request is sent to the business intelligence server 220. An example of this is expanding a node in the metadata tree. If the client has a complete list of children in the client copy of the common business intelligence object model, it displays these children. If it does not, it places the user interface into a wait state and initiates a request to the server for the information.

The browser client 200 and the business intelligence server 220 are based on a client-server application program interface (API). The client-server API reflects well-defined separation of responsibilities between the browser client 200 and the business intelligence server 220. The API comprises a set of XML requests from the browser client 200 to the business intelligence server 220. In addition, there is a set of responses returned from the business intelligence server 220 to the browser client 200. The browser client 200 assumes that the responses are received asynchronously and that, from the client perspective, the responses are independent of the request.

The browser client 200 submits requests for information and then asynchronously receives a result from the business intelligence server 220. The browser client 200 has the ability to handle unexpected results or error situations when dealing with asynchronous results.

The client requests submitted to the business intelligence server 220 has three portions: a request, a server context, and a client context. The request portion is described below with an example.

The server context is supplied to the browser client 200 with the result of a client request by the business intelligence server 220. This server context is then supplied back to the business intelligence server 220 on other requests. The server context is a portion of well-formed XML that is treated as a black box by the browser client 200.

The client context is a portion of well-formed XML supplied to the business intelligence server 220 in a request that will be returned to the browser client 200 with the request result. From the server's perspective, this XML can be seen as a black box.

The business intelligence server 220 receives requests for information or action from the browser client 200. After it has completed the action (or after it is partially finished the action), the business intelligence server 220 returns a result to the browser client 200. The result may include an indication to the browser client 200 that the result is only partial and that subsequent information is available.

Responses returned from the business intelligence server 220 have three portions: a result, a server context, and a client context. The result portion is described below using an example.

The client context is returned from the business intelligence server 220 exactly as it was supplied from the browser client 200 in the request.

The server context is described below and is managed by the business intelligence server 220 and supplied to the browser client 200 in the result. The browser client 200 roundtrips the latest server context with each request. Because the browser client 200 processes results asynchronously, the business intelligence server 220 minimizes its dependence on order of requests when updating the server context.

The client server API uses identifiers (or ids) to uniquely identify objects within each request. When one object in a request references another object in a request, it does so using an idref.

The XML exchanged between the browser client 200 and the business intelligence server 220 uses ids and idrefs. These ids and idrefs are consistent only within the document itself. Ids are relatively small to aid in keeping the size of documents to a minimum.

The XML also uses an element identifier elcid to indicate a unique identifier for an object. The elcid identifier is unique and stable across the shared object model. It is valid and correct for both the client and the server.

In order to map the id to the elcid, object references are provided within the document. For example, a document which creates a datamatrix identifies the metadata to which it is bound. As the business intelligence server 220 does not provide the entire metadata object when one already exists, the business intelligence server 220 provides a map object which comprises simply the id and elcid of the metadata object. The datamatrix object has a metadataref property that is then looked up using the map object. The metadataref can then be converted to the appropriate metadataptr object.

The server context contains enough information that the business intelligence server 220 can map the elcid of client-generated requests to server specific representations, such as shared objects of the common BI object model and lower level objects such as objects in the OLAP data source used during querying. The server context may be partitioned.

All objects that need to refer to another object use the format of <objtype>ptr. For example, the datamatrix refers to the metadata object via the metadataptr property. This property contains the elcid value for the corresponding object. Where this is (or can not) be provided, the <objtype>ref format is used and elsewhere in the document the actual object is provided (including id) or a map object is provided.

The browser client 200 issued requests are now described using the following example:

```
<clientrequest>
    <actions>
        <action>
            <type>insert</type>
            <parameter>
                <name>source</name>
                <value>
                    <item>
                        <objptr>mun:[Locations]..[Locations (Root)]</objptr>
                        <objtype>member</objtype>
                    </item>
                </value>
            </parameter>
            <parameter>
                <name>populationtype</name>
                <value>children</value>
            </parameter>
            <target>
                <item>
                    <objptr>uuid:593</objptr>
                    <objtype>datamatrix</objtype>
                </item>
                <item>
                    <objptr>uuid:594</objptr>
                    <objtype>axis</objtype>
                </item>
            </target>
        </action>
    </actions>
    <serverstate>...</serverstate>
    <clientstate>
        <appname>
            <value>main</value>
        </appname>
    </clientstate>
</clientrequest>
```

The <clientrequest> element is the outer block of the client's call to the business intelligence server 220.

The <actions> element contains a list of actions to be performed by the business intelligence server 220.

The <action> element is an individual action to be performed on the business intelligence server 220. Typical actions are expand, setproperty, drill, nest, replace or insert. The parameters identify the object that is the recipient of the action and any other parameters associated with the action.

Server Results are now described using the following example:

```
<serverresponse>
    <requeststate status="OK"/>
    <commands>
        <command>
            <action>replace</action>
            <target>uuid:593</target>
            <datamatrix>
                <elcid>uuid:593</elcid>
                <id>uuid:593</id>
                <metadataptr>uuid:591</metadataptr>
                <filtersetptr>uuid:592</filtersetptr>
                <axis>
                    <elcid>uuid:594</elcid>
                    <id>uuid:594</id>
                    <name>rows</name>
                    <axisexpr>
                        <axisopexpr>
                            <elcid>uuid:631</elcid>
                            <type>children</type>
                            <axisexprmember>
                                <memberptr>mun:[Locations]..[Locations (Root)]</memberptr>
                            </axisexprmember>
                        </axisopexpr>
                    </axisexpr>
                </axis>
                <axis>
                    <elcid>uuid:595</elcid>
                    <id>uuid:595</id>
                    <name>columns</name>
                </axis>
                <data>
                    <axisdata>
                        <axisptr>uuid:594</axisptr>
                        <node>
                            <memberptr>mun:[Locations]..[Locations (Root)].[Europe]</memberptr>
                            <axisopexprptr>uuid:631</axisopexprptr>
                        </node>
                        <node>
                            <memberptr>mun:[Locations]..[Locations (Root)].[Far East]</memberptr>
                            <axisopexprptr>uuid:631</axisopexprptr>
                        </node>
                        <node>
                            <memberptr>mun:[Locations]..[Locations (Root)].[Americas]</memberptr>
                            <axisopexprptr>uuid:631</axisopexprptr>
                        </node>
                    </axisdata>
                </data>
            </datamatrix>
        </command>
    </commands>
    <serverstate>see below</serverstate>
```

-continued

```
<clientstate>
    <appname>
        <value>anapp</value>
    </appname>
</clientstate>
</serverresponse>
```

The server response element is the outer block of the response. It has no attributes.

The requeststate element contains information about the success or failure of the response. It may optionally contain error messages or other indicators about the overall state of the business intelligence server 220 and information needed to retry the request at another server if the browser client 200 has redundant servers it can communicate. This entry may contain the application name, contained within the <appname> element and a request identifier.

The server context is a snapshot picture of the view of object state represented by the combining the previous action submitted to the business intelligence server 220 and the previous server state. The context is contained within the <serverstate> element. The browser client 200 does not modify any contents of the <serverstate> element, but returns it as-is to the business intelligence server 220 on the subsequent request.

The <commands> element contains a set of <command> elements. While each <command> element is independent, they may contain related data. As a result, the browser client 200 processes each <command> element in the specified order. In addition, a list of <map> elements may also be contained.

The command element contains the results issued by the business intelligence server 220. These are action directives to the browser client 200 to update specified portions of the object model it maintains. Each command indicates that a set of information is either to be created, wholly replaced, updated or deleted. The types of sets of information the browser client 200 understands may include datamatrix, metadata, filter, worksheet, layout, and resources (localized strings).

A <map> element contains two attributes: an id and an elcid. The id refers to the id used within the document and the elcid to the element identification of this object, as described above.

The main objects are described below.

Client commands are generally comprised of four parts. The first part is the action type. The second is the parameters section. It consists of a <parameters> object and within there a <parameter> object which has two sub-elements (name and value). The third section is a target object (see below for details). The value may be simple text or other XML child elements. The fourth section is a source object. This is contained within the parameters section, but is a common parameter for most commands. The contents of the source parameter value are an XML description of the source item.

Examples of client actions are now described. Except for the target, all parameters described below appear within the parameters section and consist of name value pairs.

For example, an initial action, Init (string package, boolean query), requests initial information from the server. The expected result includes layout and resource information. The parameter is a package whose value is a name of a package. The return commands are as follows:

| Command | Target | Description |
| --- | --- | --- |
| create | metadata | |
| merge | member | Member (one for each root member) |
| create | resource | |
| create | filterset | |
| create | metadata | |
| create | worksheet | |
| create | layout | |
| create | versioninfo | |

An expand action, expand (target, source), is used to expand a piece of metadata. The parameters are a target whose value is an item of type metadata, and a source whose value is an item of type member. The return command is merge whose target is a member. The member will correspond to the one specified in the source parameter.

An insert action, insert (target, source, populationtype), is used to insert a member into an empty datamatrix axis. The parameters are a target whose value is an item of type axis, a source whose value is an item of type member, and a populationtype whose value is a one of children or member. The return commands are as follows:

| Command | Target | Description |
| --- | --- | --- |
| Merge | member | As needed to describe axis members |
| Replace | Datamatrix | New definition of datamatrix |

The insert action, insert (target, source, otheritems), is used to set the default measure of the crosstab. The parameters are a parm name whose value is a value description, a target whose value is an item of type datamatrix, and a source whose value is an item of type measure. Also, there may be otheritems whose value are any additional measures to add (contains a list of items). The return commands are as follows:

| Command | Target | Description |
| --- | --- | --- |
| Replace | Datamatrix | New definition of datamatrix |

A search action, search (filterset, clientid), causes the server to invoke search behaviour and return a replace of the client definition of the search object. The search object is somewhat unique in that its creation is done by the client. The parameters are a parm name whose value is a value description, a filterset whose value is a describes the filter to be used for the search, and a clientid whose value is an Id generated by client use to reference search result. The return commands are as follows:

| Command | Target | Description |
| --- | --- | --- |
| Cmd | Target | Description |
| merge | member | As needed to describe search members |
| Replace | searchresult | New definition of searchresult |

Examples of main objects are now described. Element date is a standard locale independent date/time specification. This element is used by the following elements, and has the following source:

```
serverstate/datamatrix/axis/axisexpr/block/subset/filterexpr/filteropexpr/
restriction/restrRange/range From
serverstate/filterset/filter/block/subset/filterexpr/filteropexpr/
restriction/restrRange/rangeFrom
serverstate/datamatrix/axis/axisexpr/block/subset/filterexpr/filteropexpr/
restriction/restrRange/rangeTo
serverstate/filterset/filter/block/subset/filterexpr/filteropexpr/
restriction/restrRange/rangeTo
<xs:element name="date">
   <xs:annotation>
      <xs:documentation>some standard locale independent date/time
spec</xs:documentation>
   </xs:annotation>
</xs:element>
```

Figure 5:
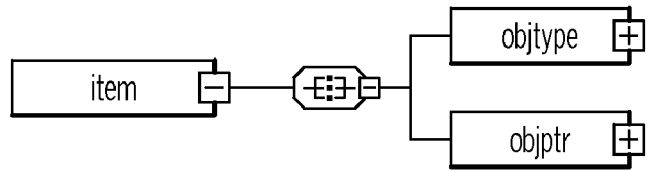
FIG. 5 is a diagram showing an item object in a shared common object model.

Element Item is shown in FIG. 5. This element is used by the following elements, and has the following source:

```
serverstate/datamatrix/axis/axisexpr/block/subset/filterexpr/filteropexpr
serverstate/filterset/filter/block/subset/filterexpr/filteropexpr
serverstate/datamatrix/axis/axisexpr/block/subsetfilter/sortmembers
serverstate/filterset/filter/block/subsetfilter/sortmembers
serverstate/datamatrix/axis/axisexpr/block/subset/filterexpr/
filteropexpr/restriction/restrTopsBottoms/tbBase
serverstate/filterset/filter/block/subset/filterexpr/
filteropexpr/restriction/restrTopsBottoms/tbBase
<xs:element name="item">
   <xs:complexType>
      <xs:all>
         <xs:element name="objtype"/>
         <xs:element name="objptr"/>
      </xs:all>
   </xs:complexType>
</xs:element>
```

Figure 6:
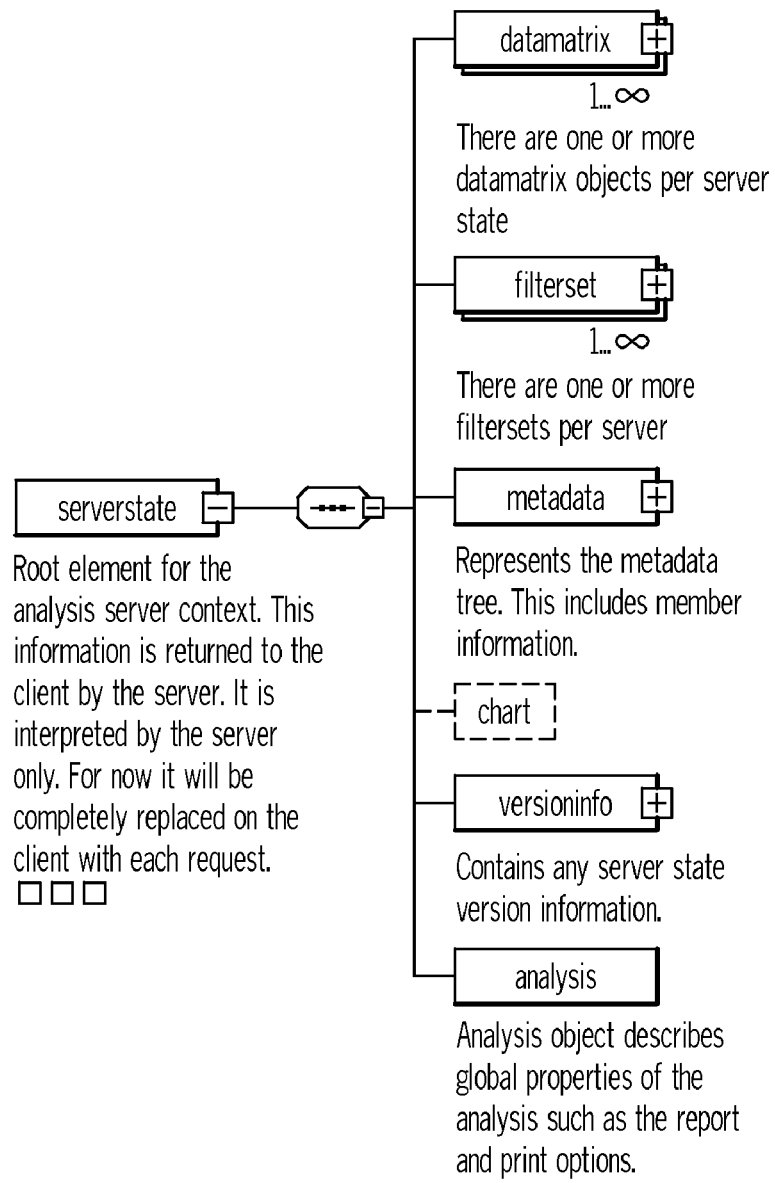
FIG. 6 is a diagram showing a serverstate object in the shared common object model.
Figure 7:
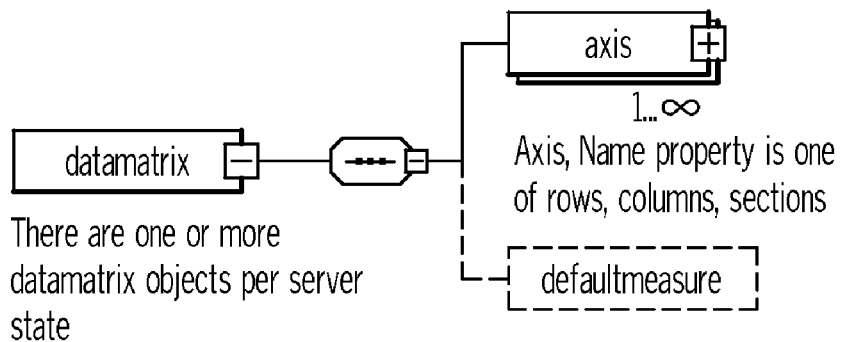
FIG. 7 is a diagram showing a datamatrix object in the shared common object model.

Element serverstate is shown in FIG. 6. This element has children: datamatrix, filterset, metadata, chart, versioninfo, and analysisis. This is the root element for the analysis server context. This information is returned to the client by the server. It is the client's responsibility to send this back with each request to the server. It is interpreted by the server only. It may be completely replaced on the client with each request The source is as following:

Element serverstate/datamatrix is shown in FIG. 7. This element has children: axis and defaultmeasure. There are one or more datamatrix objects per server state. The attributes and the source are as following:

| Name | Type | Use |
| --- | --- | --- |
| elcid | xs:string | required |
| metadataptr | xs:string | required |
| filtersetptr | xs:string | required |

```
<xs:element name="datamatrix" maxOccurs="unbounded">
   <xs:annotation>
      <xs:documentation>There are one or more datamatrix objects per server
state</xs:documentation>
   </xs:annotation>
   <xs:complexType>
      <xs:sequence>
         <xs:element name="axis" maxOccurs="unbounded">
            <xs:annotation>
               <xs:documentation>Axis. Name property is one of rows, columns,
sections</xs:documentation>
            </xs:annotation>
            <xs:complexType>
               <xs:all>
                  <xs:element name="axisexpr" minOccurs="0">
                     <xs:annotation>
                        <xs:documentation>Acts as place to keep the expression for the axis. There is only
one per axis.</xs:documentation>
                     </xs:annotation>
                     <xs:complexType>
                        <xs:choice>
                           <xs:element name="axisop" minOccurs="0">
                              <xs:annotation>
                                 <xs:documentation>ops are either crossjoined or unioned</xs:documentation>
                              </xs:annotation>
                              <xs:complexType>
                                 <xs:choice>
                                    <xs:element name="block" minOccurs="0" maxOccurs="unbounded"/>
                                    <xs:element name="axisop" minOccurs="0" maxOccurs="unbounded"/>
                                 </xs:choice>
                                 <xs:attribute name="type" type="xs:string"/>
                              </xs:complexType>
                           </xs:element>
                           <xs:element name="block" minOccurs="0">
                              <xs:annotation>
                                 <xs:documentation>referenceable expression. Types include children of,
member union and measure union</xs:documentation>
                              </xs:annotation>
                              <xs:complexType>
                                 <xs:sequence>
```

-continued

```
<xs:element name="memberlist">
    <xs:complexType>
        <xs:sequence>
            <xs:element name="axisexprmember" maxOccurs="unbounded">
                <xs:complexType>
                    <xs:attribute name="memberptr" type="xs:string" use="optional"/>
                    <xs:attribute name="measureptr" type="xs:string" use="optional"/>
                    <xs:attribute name="calcptr" type="xs:string" use="optional"/>
                    <xs:attribute name="membertype" type="xs:string" use="optional"/>
                </xs:complexType>
            </xs:element>
        </xs:sequence>
    </xs:complexType>
</xs:element>
<xs:element name="subset" minOccurs="0">
    <xs:complexType>
        <xs:all>
            <xs:element name="filterexpr" minOccurs="0">
                <xs:complexType>
                    <xs:choice>
                        <xs:element name="filterop" maxOccurs="unbounded">
                            <xs:annotation>
                                <xs:documentation>A filterop can contain 2 items of any combination from filteropexpr and filterop. Valid filter operations are and, or and subset.</xs:documentation>
                            </xs:annotation>
                            <xs:complexType>
                                <xs:all>
                                    <xs:element name="filteropexpr" minOccurs="0"/>
                                    <xs:element name="filterop" minOccurs="0"/>
                                </xs:all>
                                <xs:attribute name="filteroptype" default="and">
                                    <xs:simpleType>
                                        <xs:restriction base="xs:string">
                                            <xs:enumeration value="and"/>
                                            <xs:enumeration value="or"/>
                                        </xs:restriction>
                                    </xs:simpleType>
                                </xs:attribute>
                            </xs:complexType>
                        </xs:element>
                        <xs:element name="filteropexpr" maxOccurs="unbounded">
                            <xs:complexType>
                                <xs:all>
                                    <xs:element ref="item" minOccurs="0"/>
                                    <xs:element name="restriction" minOccurs="0">
                                        <xs:complexType>
                                            <xs:all>
                                                <xs:element name="restrRange">
                                                    <xs:complexType>
                                                        <xs:all>
                                                            <xs:element name="rangeFrom">
                                                                <xs:annotation>
                                                                    <xs:documentation>Can contain a numeric value directly or a date element</xs:documentation>
                                                                </xs:annotation>
                                                                <xs:complexType>
                                                                    <xs:choice>
                                                                        <xs:element ref="date" minOccurs="0"/>
                                                                    </xs:choice>
                                                                </xs:complexType>
                                                            </xs:element>
                                                            <xs:element name="rangeTo">
                                                                <xs:complexType>
                                                                    <xs:choice>
                                                                        <xs:element ref="date" minOccurs="0"/>
                                                                    </xs:choice>
                                                                </xs:complexType>
                                                            </xs:element>
                                                        </xs:all>
                                                        <xs:attribute name="rangeShowMissing" type="xs:boolean">
                                                            <xs:annotation>
                                                                <xs:documentation>Show missing values is an option for range filters in Query Studio</xs:documentation>
                                                            </xs:annotation>
                                                        </xs:attribute>
                                                        <xs:attribute name="rangeExclude" type="xs:boolean">
                                                            <xs:annotation>
                                                                <xs:documentation>Allows the user to exclude a certain
```

-continued

```
range as well as including - useful for viewing the extremes</xs:documentation>
                                            </xs:annotation>
                                        </xs:attribute>
                                    </xs:complexType>
                                </xs:element>
                                <xs:element name="restrTopsBottoms">
                                    <xs:complexType>
                                        <xs:all>
                                            <xs:element name="tbType">
                                                <xs:annotation>
                                                    <xs:documentation>top or bottom </xs:documentation>
                                                </xs:annotation>
                                                <xs:complexType/>
                                            </xs:element>
                                            <xs:element name="tbShowN">
                                                <xs:annotation>
                                                    <xs:documentation>number to show or percentage to
show</xs:documentation>
                                                </xs:annotation>
                                            </xs:element>
                                            <xs:element name="tbPercentage" minOccurs="0">
                                                <xs:annotation>
                                                    <xs:documentation>true or false - indicates whether or
not percantage values are used. Default is false.</xs:documentation>
                                                </xs:annotation>
                                            </xs:element>
                                            <xs:element name="tbBase">
                                                <xs:annotation>
                                                    <xs:documentation>what the top/bottom n is based on -
how it's determined</xs:documentation>
                                                </xs:annotation>
                                                <xs:complexType>
                                                    <xs:sequence>
                                                        <xs:element ref="item"/>
                                                    </xs:sequence>
                                                </xs:complexType>
                                            </xs:element>
                                        </xs:all>
                                        <xs:attribute name="tbType" use="required">
                                            <xs:annotation>
                                                <xs:documentation>top or bottom</xs:documentation>
                                            </xs:annotation>
                                            <xs:simpleType>
                                                <xs:restriction base="xs:string">
                                                    <xs:enumeration value="top"/>
                                                    <xs:enumeration value="bottom"/>
                                                </xs:restriction>
                                            </xs:simpleType>
                                        </xs:attribute>
                                        <xs:attribute name="tbPercentage" type="xs:boolean"
use="optional"/>
                                            <xs:attribute name="tbShowN" type="xs:int" use="required"/>
                                    </xs:complexType>
                                </xs:element>
                                <xs:element name="restStringMatch">
                                    <xs:annotation>
                                        <xs:documentation>usually used for string matching.
Contains exact string to match.</xs:documentation>
                                    </xs:annotation>
                                    <xs:complexType>
                                        <xs:choice>
                                            <xs:element name="strMatchType">
                                                <xs:annotation>
                                                    <xs:documentation>enumerated list of starts, ends, exact
or contains</xs:documentation>
                                                </xs:annotation>
                                            </xs:element>
                                            <xs:element name="strMatchValue">
                                                <xs:annotation>
                                                    <xs:documentation>The string to
match</xs:documentation>
                                                </xs:annotation>
                                            </xs:element>
                                        </xs:choice>
                                        <xs:attribute name="strMatchType" type="xs:string"/>
                                        <xs:attribute name="strMatchValue" type="xs:string"/>
                                    </xs:complexType>
                                </xs:element>
                            </xs:all>
```

```
                        </xs:complexType>
                    </xs:element>
                    <xs:element name="suppressdef" minOccurs="0">
                        <xs:complexType>
                            <xs:attribute name="state" type="xs:string" use="required"/>
                            <xs:attribute name="type" type="xs:string" use="required"/>
                        </xs:complexType>
                    </xs:element>
                </xs:all>
                <xs:attribute name="elcid" type="xs:string" use="required"/>
            </xs:complexType>
        </xs:element>
        <xs:element name="sortmembers" minOccurs="0">
            <xs:complexType>
                <xs:sequence>
                    <xs:element name="memberptr" maxOccurs="unbounded"/>
                </xs:sequence>
            </xs:complexType>
        </xs:element>
        <xs:element name="sortmeasure" minOccurs="0"/>
    </xs:choice>
    <xs:attribute name="fleType">
        <xs:simpleType>
            <xs:restriction base="xs:string">
                <xs:enumeration value="dimensionconstrain"/>
                <xs:enumeration value="complex"/>
            </xs:restriction>
        </xs:simpleType>
    </xs:attribute>
    <xs:attribute name="sorttype" type="xs:string" use="optional"/>
    <xs:attribute name="setsize" type="xs:unsignedInt" use="optional"/>
                </xs:complexType>
            </xs:element>
        </xs:all>
    </xs:complexType>
</xs:element>
<xs:element name="excludedlist" minOccurs="0">
    <xs:complexType>
        <xs:all>
            <xs:element name="memberlist" minOccurs="0">
                <xs:complexType>
                    <xs:sequence>
                        <xs:element name="axisexprmember" maxOccurs="unbounded">
                            <xs:complexType>
                                <xs:attribute name="memberptr" type="xs:string" use="optional"/>
                                <xs:attribute name="measureptr" type="xs:string" use="optional"/>
                                <xs:attribute name="calcptr" type="xs:string" use="optional"/>
                                <xs:attribute name="membertype" type="xs:string" use="optional"/>
                            </xs:complexType>
                        </xs:element>
                    </xs:sequence>
                </xs:complexType>
            </xs:element>
        </xs:all>
    </xs:complexType>
</xs:element>
<xs:element name="hiddenlist" minOccurs="0">
    <xs:complexType>
        <xs:all>
            <xs:element name="memberlist" minOccurs="0">
                <xs:complexType>
                    <xs:sequence>
                        <xs:element name="axisexprmember" maxOccurs="unbounded">
                            <xs:complexType>
                                <xs:attribute name="memberptr" type="xs:string" use="optional"/>
                                <xs:attribute name="measureptr" type="xs:string" use="optional"/>
                                <xs:attribute name="calcptr" type="xs:string" use="optional"/>
                                <xs:attribute name="membertype" type="xs:string" use="optional"/>
                            </xs:complexType>
                        </xs:element>
                    </xs:sequence>
                </xs:complexType>
            </xs:element>
        </xs:all>
    </xs:complexType>
</xs:element>
<xs:element name="sortmeasure" minOccurs="0"/>
<xs:element name="sortmembers" minOccurs="0">
    <xs:complexType>
```

-continued

```
                <xs:sequence>
                    <xs:element name="memberptr" maxOccurs="unbounded"/>
                </xs:sequence>
            </xs:complexType>
        </xs:element>
        <xs:element name="calculations" minOccurs="0">
            <xs:complexType>
                <xs:sequence>
                    <xs:element name="calc" maxOccurs="unbounded">
                        <xs:complexType>
                            <xs:choice>
                                <xs:element name="calcdefptr"/>
                                <xs:element name="calcexpr"/>
                            </xs:choice>
                            <xs:attribute name="calcdefptr" type="xs:string" use="required"/>
                            <xs:attribute name="calcexprptr" type="xs:string" use="required"/>
                        </xs:complexType>
                    </xs:element>
                </xs:sequence>
            </xs:complexType>
        </xs:element>
        <xs:element name="propertylist" minOccurs="0">
            <xs:complexType>
                <xs:sequence>
                    <xs:element name="propertyptr"/>
                </xs:sequence>
            </xs:complexType>
        </xs:element>
        <xs:element name="userdeffilter" minOccurs="0">
            <xs:annotation>
                <xs:documentation>Only present if block has a user-defined filter applied to it.</xs:documentation>
            </xs:annotation>
            <xs:complexType>
                <xs:all>
                    <xs:element name="expression" minOccurs="0">
                        <xs:complexType>
                            <xs:all>
                                <xs:element name="apply">
                                    <xs:annotation>
                                        <xs:documentation>What follows is a MathML Expression which expresses the user defined filter.</xs:documentation>
                                    </xs:annotation>
                                    <xs:complexType>
                                        <xs:choice>
                                            <xs:element name="and"/>
                                            <xs:element name="or"/>
                                            <xs:element name="apply"/>
                                        </xs:choice>
                                    </xs:complexType>
                                </xs:element>
                            </xs:all>
                            <xs:attribute name="fleType">
                                <xs:simpleType>
                                    <xs:restriction base="xs:string">
                                        <xs:enumeration value="dimensionconstrain"/>
                                        <xs:enumeration value="complex"/>
                                    </xs:restriction>
                                </xs:simpleType>
                            </xs:attribute>
                            <xs:attribute name="sorttype" type="xs:string" use="optional"/>
                            <xs:attribute name="setsize" type="xs:unsignedInt" use="optional"/>
                        </xs:complexType>
                    </xs:element>
                </xs:all>
            </xs:complexType>
        </xs:element>
        <xs:element name="subsetfilter" minOccurs="0">
            <xs:annotation>
                <xs:documentation>Only present if the block has a subset filter applied to it. (Top/Bottom)</xs:documentation>
            </xs:annotation>
            <xs:complexType>
                <xs:choice>
                    <xs:element name="sortmembers" minOccurs="0">
                        <xs:complexType>
                            <xs:sequence>
                                <xs:element ref="item" maxOccurs="unbounded"/>
                            </xs:sequence>
```

-continued

```
                </xs:complexType>
              </xs:element>
              <xs:element name="sortmeasure" minOccurs="0"/>
            </xs:choice>
            <xs:attribute name="setsize" type="xs:int" use="required"/>
            <xs:attribute name="sorttype" type="xs:string" use="required"/>
          </xs:complexType>
        </xs:element>
      </xs:sequence>
      <xs:attribute name="elcid" type="xs:string" use="required"/>
      <xs:attribute name="type" type="xs:string" use="required"/>
      <xs:attribute name="shareenabled" type="xs:boolean" use="optional"/>
      <xs:attribute name="blocksize" type="xs:short" use="optional"/>
      <xs:attribute name="hierarchyenabled" type="xs:boolean" use="optional"/>
      <xs:attribute name="annotation" type="xs:string" use="optional"/>
      <xs:attribute name="sorttype" type="xs:string" use="optional"/>
      <xs:attribute name="subtotalenabled" type="xs:boolean" use="optional"/>
      <xs:attribute name="islocked" type="xs:boolean" use="optional"/>
    </xs:complexType>
  </xs:element>
 </xs:choice>
</xs:complexType>
</xs:element>
</xs:all>
<xs:attribute name="elcid" type="xs:string"/>
<xs:attribute name="name" type="xs:string"/>
</xs:complexType>
</xs:element>
<xs:element name="defaultmeasure" minOccurs="0">
  <xs:complexType>
    <xs:attribute name="measureptr" type="xs:string" use="required"/>
  </xs:complexType>
</xs:element>
</xs:sequence>
<xs:attribute name="elcid" type="xs:string" use="required"/>
<xs:attribute name="metadataptr" type="xs:string" use="required"/>
<xs:attribute name="filtersetptr" type="xs:string" use="required"/>
</xs:complexType>
</xs:element>
```

Figure 8:
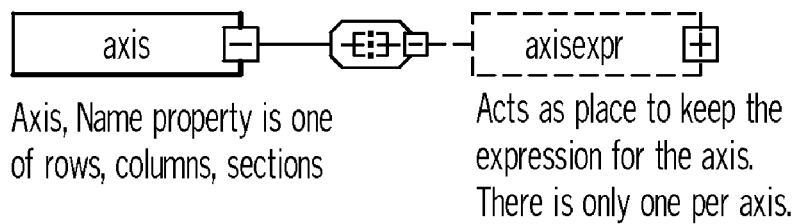
FIG. 8 is a diagram showing an axis object in the shared common object model.

Element serverstate/datamatrix/axis is shown in FIG. 8. This element has a child: axisexpr. Name property is one of rows, columns, sections. The attributes and the source are as following:

| Name | Type |
|---|---|
| elcid | xs:string |
| name | xs:string |

```
<xs:element name="axis" maxOccurs="unbounded">
  <xs:annotation>
    <xs:documentation>Axis. Name property is one of rows, columns,
sections</xs:documentation>
  </xs:annotation>
  <xs:complexType>
    <xs:all>
      <xs:element name="axisexpr" minOccurs="0">
        <xs:annotation>
          <xs:documentation>Acts as place to keep the expression for the axis. There is only
one per axis.</xs:documentation>
        </xs:annotation>
        <xs:complexType>
          <xs:choice>
            <xs:element name="axisop" minOccurs="0">
              <xs:annotation>
                <xs:documentation>ops are either crossjoined or unioned</xs:documentation>
              </xs:annotation>
              <xs:complexType>
                <xs:choice>
                  <xs:element name="block" minOccurs="0" maxOccurs="unbounded"/>
                  <xs:element name="axisop" minOccurs="0" maxOccurs="unbounded"/>
                </xs:choice>
```

-continued

```
                    <xs:attribute name="type" type="xs:string"/>
                </xs:complexType>
            </xs:element>
            <xs:element name="block" minOccurs="0">
                <xs:annotation>
                    <xs:documentation>referenceable expression. Types include children of, member union and measure union</xs:documentation>
                </xs:annotation>
                <xs:complexType>
                    <xs:sequence>
                        <xs:element name="memberlist">
                            <xs:complexType>
                                <xs:sequence>
                                    <xs:element name="axisexprmember" maxOccurs="unbounded">
                                        <xs:complexType>
                                            <xs:attribute name="memberptr" type="xs:string" use="optional"/>
                                            <xs:attribute name="measureptr" type="xs:string" use="optional"/>
                                            <xs:attribute name="calcptr" type="xs:string" use="optional"/>
                                            <xs:attribute name="membertype" type="xs:string" use="optional"/>
                                        </xs:complexType>
                                    </xs:element>
                                </xs:sequence>
                            </xs:complexType>
                        </xs:element>
                        <xs:element name="subset" minOccurs="0">
                            <xs:complexType>
                                <xs:all>
                                    <xs:element name="filterexpr" minOccurs="0">
                                        <xs:complexType>
                                            <xs:choice>
                                                <xs:element name="filterop" maxOccurs="unbounded">
                                                    <xs:annotation>
                                                        <xs:documentation>A filterop can contain 2 items of any combination from filteropexpr and filterop. Valid filter operations are and, or and subset.</xs:documentation>
                                                    </xs:annotation>
                                                    <xs:complexType>
                                                        <xs:all>
                                                            <xs:element name="filteropexpr" minOccurs="0"/>
                                                            <xs:element name="filterop" minOccurs="0"/>
                                                        </xs:all>
                                                        <xs:attribute name="filteroptype" default="and">
                                                            <xs:simpleType>
                                                                <xs:restriction base="xs:string">
                                                                    <xs:enumeration value="and"/>
                                                                    <xs:enumeration value="or"/>
                                                                </xs:restriction>
                                                            </xs:simpleType>
                                                        </xs:attribute>
                                                    </xs:complexType>
                                                </xs:element>
                                                <xs:element name="filteropexpr" maxOccurs="unbounded">
                                                    <xs:complexType>
                                                        <xs:all>
                                                            <xs:element ref="item" minOccurs="0"/>
                                                            <xs:element name="restriction" minOccurs="0">
                                                                <xs:complexType>
                                                                    <xs:all>
                                                                        <xs:element name="restrRange">
                                                                            <xs:complexType>
                                                                                <xs:all>
                                                                                    <xs:element name="rangeFrom">
                                                                                        <xs:annotation>
                                                                                            <xs:documentation>Can contain a numeric value directly or a date element</xs:documentation>
                                                                                        </xs:annotation>
                                                                                        <xs:complexType>
                                                                                            <xs:choice>
                                                                                                <xs:element ref="date" minOccurs="0"/>
                                                                                            </xs:choice>
                                                                                        </xs:complexType>
                                                                                    </xs:element>
                                                                                    <xs:element name="rangeTo">
                                                                                        <xs:complexType>
                                                                                            <xs:choice>
                                                                                                <xs:element ref="date" minOccurs="0"/>
                                                                                            </xs:choice>
                                                                                        </xs:complexType>
                                                                                    </xs:element>
```

-continued

```
            </xs:all>
            <xs:attribute name="rangeShowMissing" type="xs:boolean">
                <xs:annotation>
                    <xs:documentation>Show missing values is an option for range filters in Query Studio</xs:documentation>
                </xs:annotation>
            </xs:attribute>
            <xs:attribute name="rangeExclude" type="xs:boolean">
                <xs:annotation>
                    <xs:documentation>Allows the user to exclude a certain range as well as including - useful for viewing the extremes</xs:documentation>
                </xs:annotation>
            </xs:attribute>
        </xs:complexType>
    </xs:element>
    <xs:element name="restrTopsBottoms">
        <xs:complexType>
            <xs:all>
                <xs:element name="tbType">
                    <xs:annotation>
                        <xs:documentation>top or bottom </xs:documentation>
                    </xs:annotation>
                    <xs:complexType/>
                </xs:element>
                <xs:element name="tbShowN">
                    <xs:annotation>
                        <xs:documentation>number to show or percentage to show</xs:documentation>
                    </xs:annotation>
                </xs:element>
                <xs:element name="tbPercentage" minOccurs="0">
                    <xs:annotation>
                        <xs:documentation>true or false - indicates whether or not percantage values are used. Default is false.</xs:documentation>
                    </xs:annotation>
                </xs:element>
                <xs:element name="tbBase">
                    <xs:annotation>
                        <xs:documentation>what the top/bottom n is based on - how it's determined</xs:documentation>
                    </xs:annotation>
                    <xs:complexType>
                        <xs:sequence>
                            <xs:element ref="item"/>
                        </xs:sequence>
                    </xs:complexType>
                </xs:element>
            </xs:all>
            <xs:attribute name="tbType" use="required">
                <xs:annotation>
                    <xs:documentation>top or bottom</xs:documentation>
                </xs:annotation>
                <xs:simpleType>
                    <xs:restriction base="xs:string">
                        <xs:enumeration value="top"/>
                        <xs:enumeration value="bottom"/>
                    </xs:restriction>
                </xs:simpleType>
            </xs:attribute>
            <xs:attribute name="tbPercentage" type="xs:boolean" use="optional"/>
            <xs:attribute name="tbShowN" type="xs:int" use="required"/>
        </xs:complexType>
    </xs:element>
    <xs:element name="restStringMatch">
        <xs:annotation>
            <xs:documentation>usually used for string matching. Contains exact string to match.</xs:documentation>
        </xs:annotation>
        <xs:complexType>
            <xs:choice>
                <xs:element name="strMatchType">
                    <xs:annotation>
                        <xs:documentation>enumerated list of starts, ends, exact or contains</xs:documentation>
                    </xs:annotation>
                </xs:element>
                <xs:element name="strMatchValue">
                    <xs:annotation>
```

-continued

```
                            <xs:documentation>The string to match</xs:documentation>
                          </xs:annotation>
                        </xs:element>
                      </xs:choice>
                      <xs:attribute name="strMatchType" type="xs:string"/>
                      <xs:attribute name="strMatchValue" type="xs:string"/>
                    </xs:complexType>
                  </xs:element>
                </xs:all>
              </xs:complexType>
            </xs:element>
            <xs:element name="suppressdef" minOccurs="0">
              <xs:complexType>
                <xs:attribute name="state" type="xs:string" use="required"/>
                <xs:attribute name="type" type="xs:string" use="required"/>
              </xs:complexType>
            </xs:element>
          </xs:all>
          <xs:attribute name="elcid" type="xs:string" use="required"/>
        </xs:complexType>
      </xs:element>
      <xs:element name="sortmembers" minOccurs="0">
        <xs:complexType>
          <xs:sequence>
            <xs:element name="memberptr" maxOccurs="unbounded"/>
          </xs:sequence>
        </xs:complexType>
      </xs:element>
      <xs:element name="sortmeasure" minOccurs="0"/>
    </xs:choice>
    <xs:attribute name="fleType">
      <xs:simpleType>
        <xs:restriction base="xs:string">
          <xs:enumeration value="dimensionconstrain"/>
          <xs:enumeration value="complex"/>
        </xs:restriction>
      </xs:simpleType>
    </xs:attribute>
    <xs:attribute name="sorttype" type="xs:string" use="optional"/>
    <xs:attribute name="setsize" type="xs:unsignedInt" use="optional"/>
  </xs:complexType>
</xs:element>
    </xs:all>
  </xs:complexType>
</xs:element>
<xs:element name="excludedlist" minOccurs="0">
  <xs:complexType>
    <xs:all>
      <xs:element name="memberlist" minOccurs="0">
        <xs:complexType>
          <xs:sequence>
            <xs:element name="axisexprmember" maxOccurs="unbounded">
              <xs:complexType>
                <xs:attribute name="memberptr" type="xs:string" use="optional"/>
                <xs:attribute name="measureptr" type="xs:string" use="optional"/>
                <xs:attribute name="calcptr" type="xs:string" use="optional"/>
                <xs:attribute name="membertype" type="xs:string" use="optional"/>
              </xs:complexType>
            </xs:element>
          </xs:sequence>
        </xs:complexType>
      </xs:element>
    </xs:all>
  </xs:complexType>
</xs:element>
<xs:element name="hiddenlist" minOccurs="0">
  <xs:complexType>
    <xs:all>
      <xs:element name="memberlist" minOccurs="0">
        <xs:complexType>
          <xs:sequence>
            <xs:element name="axisexprmember" maxOccurs="unbounded">
              <xs:complexType>
                <xs:attribute name="memberptr" type="xs:string" use="optional"/>
                <xs:attribute name="measureptr" type="xs:string" use="optional"/>
                <xs:attribute name="calcptr" type="xs:string" use="optional"/>
                <xs:attribute name="membertype" type="xs:string" use="optional"/>
              </xs:complexType>
            </xs:element>
          </xs:sequence>
        </xs:complexType>
      </xs:element>
```

-continued

```
                </xs:sequence>
              </xs:complexType>
            </xs:element>
          </xs:all>
        </xs:complexType>
      </xs:element>
      <xs:element name="sortmeasure" minOccurs="0"/>
      <xs:element name="sortmembers" minOccurs="0">
        <xs:complexType>
          <xs:sequence>
            <xs:element name="memberptr" maxOccurs="unbounded"/>
          </xs:sequence>
        </xs:complexType>
      </xs:element>
      <xs:element name="calculations" minOccurs="0">
        <xs:complexType>
          <xs:sequence>
            <xs:element name="calc" maxOccurs="unbounded">
              <xs:complexType>
                <xs:choice>
                  <xs:element name="calcdefptr"/>
                  <xs:element name="calcexpr"/>
                </xs:choice>
                <xs:attribute name="calcdefptr" type="xs:string" use="required"/>
                <xs:attribute name="calcexprptr" type="xs:string" use="required"/>
              </xs:complexType>
            </xs:element>
          </xs:sequence>
        </xs:complexType>
      </xs:element>
      <xs:element name="propertylist" minOccurs="0">
        <xs:complexType>
          <xs:sequence>
            <xs:element name="propertyptr"/>
          </xs:sequence>
        </xs:complexType>
      </xs:element>
      <xs:element name="userdeffilter" minOccurs="0">
        <xs:annotation>
          <xs:documentation>Only present if block has a user-defined filter applied to it.</xs:documentation>
        </xs:annotation>
        <xs:complexType>
          <xs:all>
            <xs:element name="expression" minOccurs="0">
              <xs:complexType>
                <xs:all>
                  <xs:element name="apply">
                    <xs:annotation>
                      <xs:documentation>What follows is a MathML Expression which expresses the user defined filter.</xs:documentation>
                    </xs:annotation>
                    <xs:complexType>
                      <xs:choice>
                        <xs:element name="and"/>
                        <xs:element name="or"/>
                        <xs:element name="apply"/>
                      </xs:choice>
                    </xs:complexType>
                  </xs:element>
                </xs:all>
                <xs:attribute name="fleType">
                  <xs:simpleType>
                    <xs:restriction base="xs:string">
                      <xs:enumeration value="dimensionconstrain"/>
                      <xs:enumeration value="complex"/>
                    </xs:restriction>
                  </xs:simpleType>
                </xs:attribute>
                <xs:attribute name="sorttype" type="xs:string" use="optional"/>
                <xs:attribute name="setsize" type="xs:unsignedInt" use="optional"/>
              </xs:complexType>
            </xs:element>
          </xs:all>
        </xs:complexType>
      </xs:element>
      <xs:element name="subsetfilter" minOccurs="0">
        <xs:annotation>
          <xs:documentation>Only present if the block has a subset filter applied to it.
```

```
(Top/Bottom)</xs:documentation>
                            </xs:annotation>
                            <xs:complexType>
                                <xs:choice>
                                    <xs:element name="sortmembers" minOccurs="0">
                                        <xs:complexType>
                                            <xs:sequence>
                                                <xs:element ref="item" maxOccurs="unbounded"/>
                                            </xs:sequence>
                                        </xs:complexType>
                                    </xs:element>
                                    <xs:element name="sortmeasure" minOccurs="0"/>
                                </xs:choice>
                                <xs:attribute name="setsize" type="xs:int" use="required"/>
                                <xs:attribute name="sorttype" type="xs:string" use="required"/>
                            </xs:complexType>
                        </xs:element>
                    </xs:sequence>
                    <xs:attribute name="elcid" type="xs:string" use="required"/>
                    <xs:attribute name="type" type="xs:string" use="required"/>
                    <xs:attribute name="shareenabled" type="xs:boolean" use="optional"/>
                    <xs:attribute name="blocksize" type="xs:short" use="optional"/>
                    <xs:attribute name="hierarchyenabled" type="xs:boolean" use="optional"/>
                    <xs:attribute name="annotation" type="xs:string" use="optional"/>
                    <xs:attribute name="sorttype" type="xs:string" use="optional"/>
                    <xs:attribute name="subtotalenabled" type="xs:boolean" use="optional"/>
                    <xs:attribute name="islocked" type="xs:boolean" use="optional"/>
                </xs:complexType>
            </xs:element>
        </xs:choice>
    </xs:complexType>
    </xs:element>
  </xs:all>
  <xs:attribute name="elcid" type="xs:string"/>
  <xs:attribute name="name" type="xs:string"/>
 </xs:complexType>
</xs:element>
```

Figure 9:
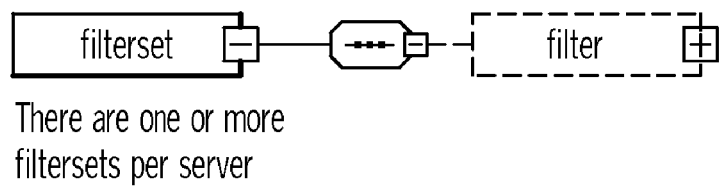
FIG. 9 is a diagram showing a filterset object in the shared common object model.

Element serverstate/filterset is shown in FIG. 9. This element has a child: filterset. There are one or more filtersets per server. The attributes and the source are as following:

| Name | Type | Use |
|---|---|---|
| elcid | xs:string | required |
| metadataptr | xs:string | required |
| scope | xs:string | required |

```
<xs:element name="filterset" maxOccurs="unbounded">
  <xs:annotation>
    <xs:documentation>There are one or more filtersets per server</xs:documentation>
  </xs:annotation>
  <xs:complexType>
    <xs:sequence>
      <xs:element name="filter" minOccurs="0">
        <xs:complexType>
          <xs:choice>
            <xs:element name="suppressdef">
              <xs:annotation>
                <xs:documentation>Suppression Filter</xs:documentation>
              </xs:annotation>
              <xs:complexType>
                <xs:attribute name="type" type="xs:string" use="required"/>
                <xs:attribute name="state" type="xs:int" use="required"/>
              </xs:complexType>
            </xs:element>
            <xs:element name="block">
              <xs:annotation>
                <xs:documentation>Dimensional Filter</xs:documentation>
              </xs:annotation>
              <xs:complexType>
                <xs:sequence>
                  <xs:element name="memberlist">
```

-continued

```
                    <xs:complexType>
                        <xs:sequence>
                            <xs:element name="axisexprmember" maxOccurs="unbounded">
                                <xs:complexType>
                                    <xs:attribute name="memberptr" type="xs:string" use="optional"/>
                                    <xs:attribute name="measureptr" type="xs:string" use="optional"/>
                                    <xs:attribute name="calcptr" type="xs:string" use="optional"/>
                                    <xs:attribute name="membertype" type="xs:string" use="optional"/>
                                </xs:complexType>
                            </xs:element>
                        </xs:sequence>
                    </xs:complexType>
                </xs:element>
                <xs:element name="subset" minOccurs="0">
                    <xs:complexType>
                        <xs:all>
                            <xs:element name="filterexpr" minOccurs="0">
                                <xs:complexType>
                                    <xs:choice>
                                        <xs:element name="filterop" maxOccurs="unbounded">
                                            <xs:annotation>
                                                <xs:documentation>A filterop can contain 2 items of any combination
from filteropexpr and filterop. Valid filter operations are and, or and
subset.</xs:documentation>
                                            </xs:annotation>
                                            <xs:complexType>
                                                <xs:all>
                                                    <xs:element name="filteropexpr" minOccurs="0"/>
                                                    <xs:element name="filterop" minOccurs="0"/>
                                                </xs:all>
                                                <xs:attribute name="filteroptype" default="and">
                                                    <xs:simpleType>
                                                        <xs:restriction base="xs:string">
                                                            <xs:enumeration value="and"/>
                                                            <xs:enumeration value="or"/>
                                                        </xs:restriction>
                                                    </xs:simpleType>
                                                </xs:attribute>
                                            </xs:complexType>
                                        </xs:element>
                                        <xs:element name="filteropexpr" maxOccurs="unbounded">
                                            <xs:complexType>
                                                <xs:all>
                                                    <xs:element ref="item" minOccurs="0"/>
                                                    <xs:element name="restriction" minOccurs="0">
                                                        <xs:complexType>
                                                            <xs:all>
                                                                <xs:element name="restrRange">
                                                                    <xs:complexType>
                                                                        <xs:all>
                                                                            <xs:element name="rangeFrom">
                                                                                <xs:annotation>
                                                                                    <xs:documentation>Can contain a numeric value directly or
a date element</xs:documentation>
                                                                                </xs:annotation>
                                                                                <xs:complexType>
                                                                                    <xs:choice>
                                                                                        <xs:element ref="date" minOccurs="0"/>
                                                                                    </xs:choice>
                                                                                </xs:complexType>
                                                                            </xs:element>
                                                                            <xs:element name="rangeTo">
                                                                                <xs:complexType>
                                                                                    <xs:choice>
                                                                                        <xs:element ref="date" minOccurs="0"/>
                                                                                    </xs:choice>
                                                                                </xs:complexType>
                                                                            </xs:element>
                                                                        </xs:all>
                                                                        <xs:attribute name="rangeShowMissing" type="xs:boolean">
                                                                            <xs:annotation>
                                                                                <xs:documentation>Show missing values is an option for
range filters in Query Studio</xs:documentation>
                                                                            </xs:annotation>
                                                                        </xs:attribute>
                                                                        <xs:attribute name="rangeExclude" type="xs:boolean">
                                                                            <xs:annotation>
                                                                                <xs:documentation>Allows the user to exclude a certain range
as well as including - useful for viewing the extremes</xs:documentation>
```

-continued

```
                    </xs:annotation>
                </xs:attribute>
            </xs:complexType>
        </xs:element>
        <xs:element name="restrTopsBottoms">
            <xs:complexType>
                <xs:all>
                    <xs:element name="tbType">
                        <xs:annotation>
                            <xs:documentation>top or bottom </xs:documentation>
                        </xs:annotation>
                        <xs:complexType/>
                    </xs:element>
                    <xs:element name="tbShowN">
                        <xs:annotation>
                            <xs:documentation>number to show or percentage to show</xs:documentation>
                        </xs:annotation>
                    </xs:element>
                    <xs:element name="tbPercentage" minOccurs="0">
                        <xs:annotation>
                            <xs:documentation>true or false - indicates whether or not percantage values are used. Default is false.</xs:documentation>
                        </xs:annotation>
                    </xs:element>
                    <xs:element name="tbBase">
                        <xs:annotation>
                            <xs:documentation>what the top/bottom n is based on - how it's determined</xs:documentation>
                        </xs:annotation>
                        <xs:complexType>
                            <xs:sequence>
                                <xs:element ref="item"/>
                            </xs:sequence>
                        </xs:complexType>
                    </xs:element>
                </xs:all>
                <xs:attribute name="tbType" use="required">
                    <xs:annotation>
                        <xs:documentation>top or bottom</xs:documentation>
                    </xs:annotation>
                    <xs:simpleType>
                        <xs:restriction base="xs:string">
                            <xs:enumeration value="top"/>
                            <xs:enumeration value="bottom"/>
                        </xs:restriction>
                    </xs:simpleType>
                </xs:attribute>
                <xs:attribute name="tbPercentage" type="xs:boolean" use="optional"/>
                <xs:attribute name="tbShowN" type="xs:int" use="required"/>
            </xs:complexType>
        </xs:element>
        <xs:element name="restStringMatch">
            <xs:annotation>
                <xs:documentation>usually used for string matching. Contains exact string to match.</xs:documentation>
            </xs:annotation>
            <xs:complexType>
                <xs:choice>
                    <xs:element name="strMatchType">
                        <xs:annotation>
                            <xs:documentation>enumerated list of starts, ends, exact or contains</xs:documentation>
                        </xs:annotation>
                    </xs:element>
                    <xs:element name="strMatchValue">
                        <xs:annotation>
                            <xs:documentation>The string to match</xs:documentation>
                        </xs:annotation>
                    </xs:element>
                </xs:choice>
                <xs:attribute name="strMatchType" type="xs:string"/>
                <xs:attribute name="strMatchValue" type="xs:string"/>
            </xs:complexType>
        </xs:element>
    </xs:all>
</xs:complexType>
</xs:element>
```

-continued

```
                    <xs:element name="suppressdef" minOccurs="0">
                        <xs:complexType>
                            <xs:attribute name="state" type="xs:string" use="required"/>
                            <xs:attribute name="type" type="xs:string" use="required"/>
                        </xs:complexType>
                    </xs:element>
                </xs:all>
                <xs:attribute name="elcid" type="xs:string" use="required"/>
            </xs:complexType>
        </xs:element>
        <xs:element name="sortmembers" minOccurs="0">
            <xs:complexType>
                <xs:sequence>
                    <xs:element name="memberptr" maxOccurs="unbounded"/>
                </xs:sequence>
            </xs:complexType>
        </xs:element>
        <xs:element name="sortmeasure" minOccurs="0"/>
    </xs:choice>
    <xs:attribute name="fleType">
        <xs:simpleType>
            <xs:restriction base="xs:string">
                <xs:enumeration value="dimensionconstrain"/>
                <xs:enumeration value="complex"/>
            </xs:restriction>
        </xs:simpleType>
    </xs:attribute>
    <xs:attribute name="sorttype" type="xs:string" use="optional"/>
    <xs:attribute name="setsize" type="xs:unsignedInt" use="optional"/>
            </xs:complexType>
        </xs:element>
    </xs:all>
</xs:complexType>
</xs:element>
<xs:element name="excludedlist" minOccurs="0">
    <xs:complexType>
        <xs:all>
            <xs:element name="memberlist" minOccurs="0">
                <xs:complexType>
                    <xs:sequence>
                        <xs:element name="axisexprmember" maxOccurs="unbounded">
                            <xs:complexType>
                                <xs:attribute name="memberptr" type="xs:string" use="optional"/>
                                <xs:attribute name="measureptr" type="xs:string" use="optional"/>
                                <xs:attribute name="calcptr" type="xs:string" use="optional"/>
                                <xs:attribute name="membertype" type="xs:string" use="optional"/>
                            </xs:complexType>
                        </xs:element>
                    </xs:sequence>
                </xs:complexType>
            </xs:element>
        </xs:all>
    </xs:complexType>
</xs:element>
<xs:element name="hiddenlist" minOccurs="0">
    <xs:complextype>
        <xs:all>
            <xs:element name="memberlist" minOccurs="0">
                <xs:complexType>
                    <xs:sequence>
                        <xs:element name="axisexprmember" maxOccurs="unbounded">
                            <xs:complexType>
                                <xs:attribute name="memberptr" type="xs:string" use="optional"/>
                                <xs:attribute name="measureptr" type="xs:string" use="optional"/>
                                <xs:attribute name="calcptr" type="xs:string" use="optional"/>
                                <xs:attribute name="membertype" type="xs:string" use="optional"/>
                            </xs:complexType>
                        </xs:element>
                    </xs:sequence>
                </xs:complexType>
            </xs:element>
        </xs:all>
    </xs:complexType>
</xs:element>
<xs:element name="sortmeasure" minOccurs="0"/>
<xs:element name="sortmembers" minOccurs="0">
    <xs:complexType>
        <xs:sequence>
            <xs:element name="memberptr" maxOccurs="unbounded"/>
```

-continued

```
                    </xs:sequence>
                </xs:complexType>
            </xs:element>
            <xs:element name="calculations" minOccurs="0">
                <xs:complexType>
                    <xs:sequence>
                        <xs:element name="calc" maxOccurs="unbounded">
                            <xs:complexType>
                                <xs:choice>
                                    <xs:element name="calcdefptr"/>
                                    <xs:element name="calcexpr"/>
                                </xs:choice>
                                <xs:attribute name="calcdefptr" type="xs:string" use="required"/>
                                <xs:attribute name="calcexprptr" type="xs:string" use="required"/>
                            </xs:complexType>
                        </xs:element>
                    </xs:sequence>
                </xs:complexType>
            </xs:element>
            <xs:element name="propertylist" minOccurs="0">
                <xs:complexType>
                    <xs:sequence>
                        <xs:element name="propertyptr"/>
                    </xs:sequence>
                </xs:complexType>
            </xs:element>
            <xs:element name="userdeffilter" minOccurs="0">
                <xs:annotation>
                    <xs:documentation>Only present if block has a user-defined filter applied to it.</xs:documentation>
                </xs:annotation>
                <xs:complexType>
                    <xs:all>
                        <xs:element name="expression" minOccurs="0">
                            <xs:complexType>
                                <xs:all>
                                    <xs:element name="apply">
                                        <xs:annotation>
                                            <xs:documentation>What follows is a MathML Expression which expresses the user defined filter.</xs:documentation>
                                        </xs:annotation>
                                        <xs:complexType>
                                            <xs:choice>
                                                <xs:element name="and"/>
                                                <xs:element name="or"/>
                                                <xs:element name="apply"/>
                                            </xs:choice>
                                        </xs:complexType>
                                    </xs:element>
                                </xs:all>
                                <xs:attribute name="fleType">
                                    <xs:simpleType>
                                        <xs:restriction base="xs:string">
                                            <xs:enumeration value="dimensionconstrain"/>
                                            <xs:enumeration value="complex"/>
                                        </xs:restriction>
                                    </xs:simpleType>
                                </xs:attribute>
                                <xs:attribute name="sorttype" type="xs:string" use="optional"/>
                                <xs:attribute name="setsize" type="xs:unsignedInt" use="optional"/>
                            </xs:complexType>
                        </xs:element>
                    </xs:all>
                </xs:complexType>
            </xs:element>
            <xs:element name="subsetfilter" minOccurs="0">
                <xs:annotation>
                    <xs:documentation>Only present if the block has a subset filter applied to it. (Top/Bottom)</xs:documentation>
                </xs:annotation>
                <xs:complexType>
                    <xs:choice>
                        <xs:element name="sortmembers" minOccurs="0">
                            <xs:complexType>
                                <xs:sequence>
                                    <xs:element ref="item" maxOccurs="unbounded"/>
                                </xs:sequence>
                            </xs:complexType>
                        </xs:element>
```

-continued
```
                    <xs:element name="sortmeasure" minOccurs="0"/>
                  </xs:choice>
                  <xs:attribute name="setsize" type="xs:int" use="required"/>
                  <xs:attribute name="sorttype" type="xs:string" use="required"/>
                </xs:complexType>
              </xs:element>
            </xs:sequence>
            <xs:attribute name="elcid" type="xs:string" use="required"/>
            <xs:attribute name="type" type="xs:string" use="required"/>
            <xs:attribute name="shareenabled" type="xs:boolean" use="optional"/>
            <xs:attribute name="blocksize" type="xs:short" use="optional"/>
            <xs:attribute name="hierarchyenabled" type="xs:boolean" use="optional"/>
            <xs:attribute name="annotation" type="xs:string" use="optional"/>
            <xs:attribute name="sorttype" type="xs:string" use="optional"/>
            <xs:attribute name="subtotalenabled" type="xs:boolean" use="optional"/>
            <xs:attribute name="islocked" type="xs:boolean" use="optional"/>
          </xs:complexType>
        </xs:element>
      </xs:choice>
      <xs:attribute name="filtertype" type="xs:string" use="required"/>
      <xs:attribute name="label" type="xs:string" use="optional"/>
      <xs:attribute name="position" type="xs:string" use="optional" default="0"/>
      <xs:attribute name="elcid" type="xs:string" use="required"/>
    </xs:complexType>
  </xs:element>
  </xs:sequence>
  <xs:attribute name="elcid" type="xs:string" use="required"/>
  <xs:attribute name="metadataptr" type="xs:string" use="required"/>
  <xs:attribute name="scope" type="xs:string" use="required"/>
</xs:complexType>
</xs:element>
```

Figure 10:
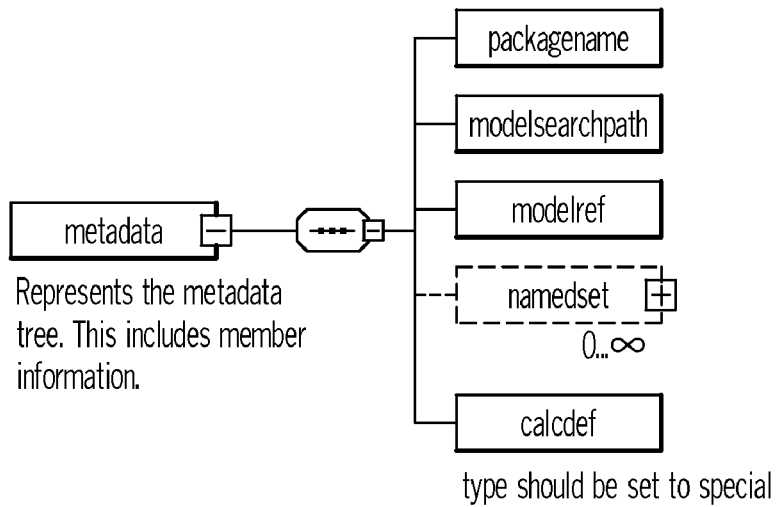
FIG. 10 is a diagram showing a metadata object in the shared common object model.

Element serverstate/metadata is shown in FIG. 10. This element has children: packagename, modelsearchpath, modelref, namedset, and calcdef. This element represents the metadata tee. This includes member information. The attributes and the source are as following:

| Name | Type | Use |
|---|---|---|
| elcid | xs:string | optional |

```
<xs:element name="metadata">
  <xs:annotation>
    <xs:documentation>Represents the metadata tree. This includes member
information.</xs:documentation>
  </xs:annotation>
  <xs:complexType>
    <xs:sequence>
      <xs:element name="packagename"/>
      <xs:element name="modelsearchpath"/>
      <xs:element name="modelref"/>
      <xs:element name="namedset" minOccurs="0" maxOccurs="unbounded">
        <xs:complexType>
          <xs:choice>
            <xs:element name="axisopexpr"/>
          </xs:choice>
          <xs:attribute name="name" type="xs:string" use="required"/>
          <xs:attribute name="elcid" type="xs:string" use="required"/>
          <xs:attribute name="annotation" type="xs:string" use="optional"/>
        </xs:complexType>
      </xs:element>
      <xs:element name="calcdef">
        <xs:annotation>
          <xs:documentation>type should be set to special</xs:documentation>
        </xs:annotation>
        <xs:complexType>
          <xs:attribute name="type" type="xs:string" use="required"/>
          <xs:attribute name="name" type="xs:string" use="required"/>
        </xs:complexType>
      </xs:element>
    </xs:sequence>
```

```
    <xs:attribute name="elcid" type="xs:string" use="optional"/>
  </xs:complexType>
</xs:element>
```

Figure 11:
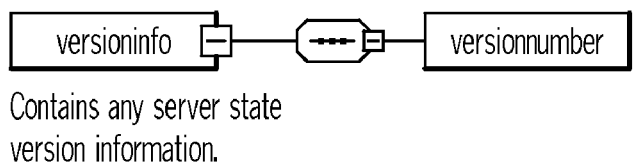
FIG. 11 is a diagram showing a versioninfo object in the shared common object model.

Element serverstate/versioninfo is shown in FIG. 11. This element has a child: versionnumber. This element contains any server state version information. The source is as following:

```
<xs:element name="versioninfo">
  <xs:annotation>
    <xs:documentation>Contains any server state version
    information.</xs:documentation>
  </xs:annotation>
  <xs:complexType>
    <xs:sequence>
      <xs:element name="versionnumber">
        <xs:complexType>
          <xs:attribute name="ver" type="xs:int" use="required"/>
        </xs:complexType>
      </xs:element>
    </xs:sequence>
  </xs:complexType>
</xs:element>
```

Figure 12:
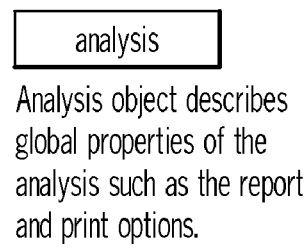
FIG. 12 is a diagram showing an analysis object in the shared common object model.

Element serverstate/analysis is shown in FIG. 12. The analysis object describes global properties of the analysis such as the report and print options. The attributes and the source are as following:

| Name | Type | Use |
|---|---|---|
| title | xs:string | required |
| subtitle | xs:string | required |
| annotation | xs:string | required |
| paperorientation | xs:string | required |
| papersize | xs:string | required |
| displayfilter | xs:boolean | required |
| displayfilterposition | xs:string | required |
| displayallitemsexpand | xs:boolean | required |
| displayoutermostgroupsonrows | xs:boolean | required |
| displaysections | xs:boolean | required |
| displaysectionsdimension | xs:string | required |
| displaysetsonrows | xs:boolean | required |

```
<xs:element name="analysis">
  <xs:annotation>
    <xs:documentation>Analysis object describes global properties of the analysis such as the
report and print options.</xs:documentation>
  </xs:annotation>
  <xs:complexType>
    <xs:attribute name="title" type="xs:string" use="required"/>
    <xs:attribute name="subtitle" type="xs:string" use="required"/>
    <xs:attribute name="annotation" type="xs:string" use="required"/>
    <xs:attribute name="paperorientation" type="xs:string" use="required"/>
    <xs:attribute name="papersize" type="xs:string" use="required"/>
    <xs:attribute name="displayfilter" type="xs:boolean" use="required"/>
    <xs:attribute name="displayfilterposition" type="xs:string" use="required"/>
    <xs:attribute name="displayallitemsexpand" type="xs:boolean" use="required"/>
    <xs:attribute name="displayoutermostgroupsonrows" type="xs:boolean" use="required"/>
    <xs:attribute name="displaysections" type="xs:boolean" use="required"/>
    <xs:attribute name="displaysectionsdimension" type="xs:string" use="required"/>
    <xs:attribute name="displaysetsonrows" type="xs:boolean" use="required"/>
  </xs:complexType>
</xs:element>
```

Figure 13:
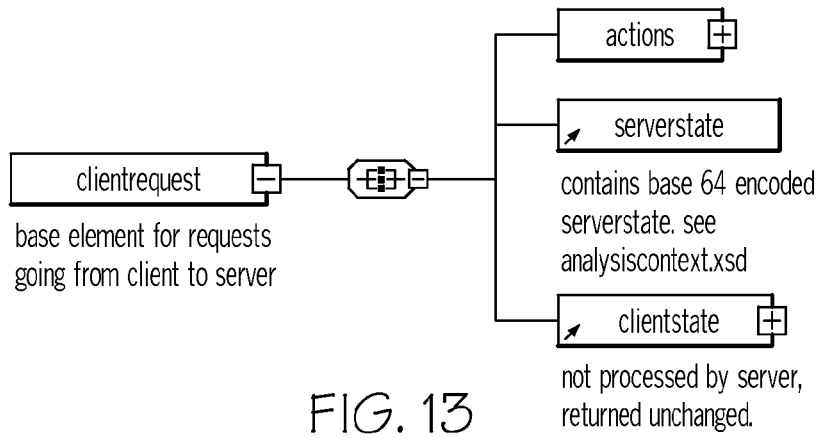
FIG. 13 is a diagram showing a clientrequest element in a client-server application program interface.

Examples of elements in the client-server API are now described. Element clientrequest is shown in FIG. 13. This element has children: actions, serverstate, and clientstate. This element is the base element for requests going from the client to the server. The source is as following:

```
<xs:element name="clientrequest">
  <xs:annotation>
    <xs:documentation>Base element for requests going from client to
```

-continued

```
server</xs:documentation>
    </xs:annotation>
    <xs:complexType>
      <xs:all>
        <xs:element name="actions">
          <xs:complexType>
            <xs:sequence>
              <xs:element name="action" maxOccurs="unbounded">
                <xs:complexType>
                  <xs:sequence>
                    <xs:element name="type" type="xs:string">
                      <xs:annotation>
                        <xs:documentation>name of action</xs:documentation>
                      </xs:annotation>
                    </xs:element>
                    <xs:element name="target" minOccurs="0">
                      <xs:annotation>
                        <xs:documentation>untargetted commands are directed at application</xs:documentation>
                      </xs:annotation>
                      <xs:complexType>
                        <xs:sequence>
                          <xs:element name="item" maxOccurs="unbounded">
                            <xs:complexType>
                              <xs:all>
                                <xs:element name="objtype"/>
                                <xs:element name="objptr" type="elcid"/>
                              </xs:all>
                            </xs:complexType>
                          </xs:element>
                        </xs:sequence>
                      </xs:complexType>
                    </xs:element>
                    <xs:element name="parameter" minOccurs="0" maxOccurs="unbounded">
                      <xs:complexType>
                        <xs:all>
                          <xs:element name="name" type="xs:string"/>
                          <xs:element name="value">
                            <xs:annotation>
                              <xs:documentation>may contain text or xml</xs:documentation>
                            </xs:annotation>
                          </xs:element>
                        </xs:all>
                      </xs:complexType>
                    </xs:element>
                  </xs:sequence>
                </xs:complexType>
              </xs:element>
            </xs:sequence>
          </xs:complexType>
        </xs:element>
        <xs:element ref="serverstate"/>
        <xs:element ref="clientstate"/>
      </xs:all>
    </xs:complexType>
</xs:element>
```

Figure 14:
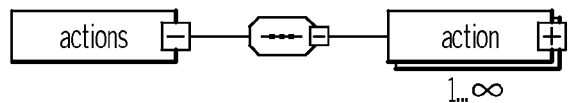
FIG. 14 is a diagram showing an actions element in the client-server application program interface.

Element clientrequest/actions is shown in FIG. 14. This element has a child: action. The source is as following:

```
<xs:element name="actions">
  <xs:complexType>
    <xs:sequence>
      <xs:element name="action" maxOccurs="unbounded">
        <xs:complexType>
          <xs:sequence>
            <xs:element name="type" type="xs:string">
              <xs:annotation>
                <xs:documentation>name of action</xs:documentation>
              </xs:annotation>
            </xs:element>
            <xs:element name="target" minOccurs="0">
```

```
                    <xs:annotation>
                        <xs:documentation>untargetted commands are directed at
application</xs:documentation>
                    </xs:annotation>
                    <xs:complexType>
                        <xs:sequence>
                            <xs:element name="item" maxOccurs="unbounded">
                                <xs:complexType>
                                    <xs:all>
                                        <xs:element name="objtype"/>
                                        <xs:element name="objptr" type="elcid"/>
                                    </xs:all>
                                </xs:complexType>
                            </xs:element>
                        </xs:sequence>
                    </xs:complexType>
                </xs:element>
                <xs:element name="parameter" minOccurs="0" maxOccurs="unbounded">
                    <xs:complexType>
                        <xs:all>
                            <xs:element name="name" type="xs:string"/>
                            <xs:element name="value">
                                <xs:annotation>
                                    <xs:documentation>may contain text or xml</xs:documentation>
                                </xs:annotation>
                            </xs:element>
                        </xs:all>
                    </xs:complexType>
                </xs:element>
            </xs:sequence>
        </xs:complexType>
    </xs:element>
  </xs:sequence>
 </xs:complexType>
</xs:element>
```

Figure 15:
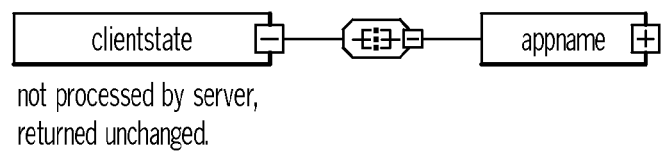
FIG. 15 is a diagram showing a clientstate element in the client-server application program interface.

Element clientstate is shown in FIG. 15. This element has a child: appname. This element is used by clientrequest, and serverresponse. It is not processed by server. It is returned unchanged. The source is as following:

```
<xs:element name="clientstate">
    <xs:annotation>
        <xs:documentation>Not processed by server. Returned
        unchanged.</xs:documentation>
    </xs:annotation>
    <xs:complexType>
        <xs:all>
            <xs:element name="appname">
                <xs:complexType>
                    <xs:all>
                        <xs:element name="value">
                            <xs:annotation>
                                <xs:documentation>Name of
                                application</xs:documentation>
                            </xs:annotation>
                        </xs:element>
                    </xs:all>
                </xs:complexType>
            </xs:element>
        </xs:all>
    </xs:complexType>
</xs:element>
```

Figure 16:
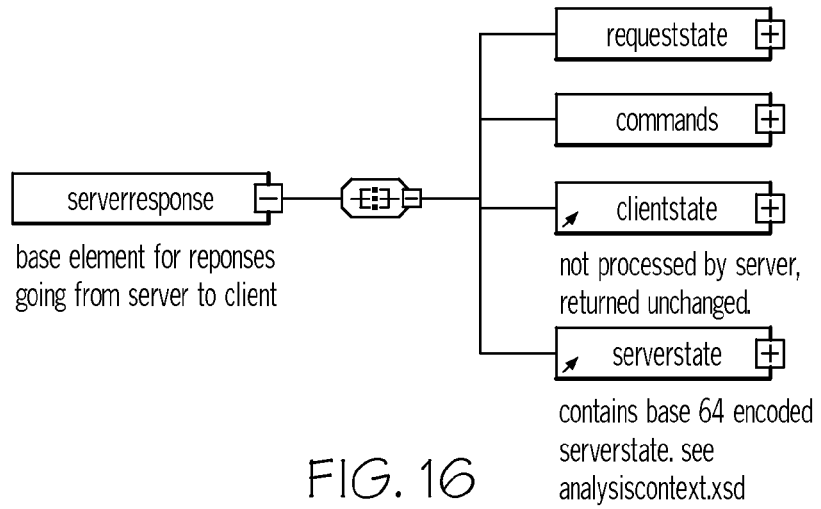
FIG. 16 is a diagram showing a serverresponse element in the client-server application program interface.

Element serverresponse is shown in FIG. 16. This element has children: requeststate, commands, clientstate, and serverstate. This element is the base element for responses going from the server to the client. The source is as following:

```
<xs:element name="serverresponse">
  <xs:annotation>
    <xs:documentation>Base element for responses going from server to
client</xs:documentation>
  </xs:annotation>
  <xs:complexType>
    <xs:all>
      <xs:element name="requeststate">
        <xs:complexType>
          <xs:sequence>
            <xs:element name="message"/>
          </xs:sequence>
          <xs:attribute name="status" type="xs:string" use="required"/>
        </xs:complexType>
      </xs:element>
      <xs:element name="commands">
        <xs:complexType>
          <xs:sequence>
            <xs:element name="command" maxOccurs="unbounded">
              <xs:complexType>
                <xs:sequence>
                  <xs:element name="action" type="xs:string">
                    <xs:annotation>
                      <xs:documentation>see sjw409 for documentation of each
action</xs:documentation>
                    </xs:annotation>
                  </xs:element>
                  <xs:element name="target" type="uuid">
                    <xs:annotation>
                      <xs:documentation>elcid of object</xs:documentation>
                    </xs:annotation>
                  </xs:element>
                  <xs:choice>
                    <xs:annotation>
                      <xs:documentation>all the elements below here are similar to those
documented in analysiscontext.xsd. Only the additional elements are shown here. Note also
that attributes in serverstate become elements in response commands.</xs:documentation>
                    </xs:annotation>
                    <xs:element name="datamatrix" minOccurs="0">
                      <xs:complexType>
                        <xs:sequence>
                          <xs:element name="data">
                            <xs:complexType>
                              <xs:sequence>
                                <xs:element name="axisdata" minOccurs="0" maxOccurs="unbounded">
                                  <xs:complexType>
                                    <xs:sequence>
                                      <xs:element name="axisptr"/>
                                      <xs:element name="node" minOccurs="0" maxOccurs="unbounded">
                                        <xs:complexType>
                                          <xs:sequence>
                                            <xs:element name="memberptr"/>
                                            <xs:element name="axisopexprptr"/>
                                            <xs:element name="summarylevel"/>
                                            <xs:element name="istotal"/>
                                          </xs:sequence>
                                        </xs:complexType>
                                      </xs:element>
                                    </xs:sequence>
                                  </xs:complexType>
                                </xs:element>
                                <xs:element name="cells" minOccurs="0">
                                  <xs:complexType>
                                    <xs:sequence>
                                      <xs:element name="cell" maxOccurs="unbounded"/>
                                    </xs:sequence>
                                  </xs:complexType>
                                </xs:element>
                              </xs:sequence>
                            </xs:complexType>
                          </xs:element>
                          <xs:element name="axis" minOccurs="0" maxOccurs="unbounded"/>
                          <xs:element name="calculations" minOccurs="0"/>
                          <xs:element name="defaultmeasure" minOccurs="0"/>
                        </xs:sequence>
                      </xs:complexType>
                    </xs:element>
                    <xs:element name="metadata" minOccurs="0"/>
                    <xs:element name="filterset" minOccurs="0"/>
```

-continued

```
<xs:element name="member" minOccurs="0"/>
<xs:element name="searchresult" minOccurs="0"/>
<xs:element name="chart" minOccurs="0"/>
<xs:element name="namedset" minOccurs="0"/>
<xs:element name="worksheet" minOccurs="0">
    <xs:complexType>
        <xs:sequence>
            <xs:element name="id"/>
            <xs:element name="datamatrixptr"/>
            <xs:element name="charttypes"/>
        </xs:sequence>
    </xs:complexType>
</xs:element>
<xs:element name="layout" minOccurs="0">
    <xs:complexType>
        <xs:sequence>
            <xs:element name="id"/>
            <xs:element name="name">
                <xs:annotation>
                    <xs:documentation>name of layout. Currently only default is supported.</xs:documentation>
                </xs:annotation>
            </xs:element>
            <xs:element name="layoutworksheets">
                <xs:annotation>
                    <xs:documentation>lists worksheets to be used by this layout</xs:documentation>
                </xs:annotation>
                <xs:complexType>
                    <xs:sequence>
                        <xs:element name="layoutworksheet" maxOccurs="unbounded">
                            <xs:complexType>
                                <xs:all>
                                    <xs:element name="worksheetptr"/>
                                </xs:all>
                            </xs:complexType>
                        </xs:element>
                    </xs:sequence>
                </xs:complexType>
            </xs:element>
            <xs:element name="layoutfiltersets">
                <xs:annotation>
                    <xs:documentation>lists filtersets to be used by this layout</xs:documentation>
                </xs:annotation>
                <xs:complexType>
                    <xs:sequence>
                        <xs:element name="layoutfilterset" maxOccurs="unbounded">
                            <xs:complexType>
                                <xs:all>
                                    <xs:element name="filtersetptr"/>
                                </xs:all>
                            </xs:complexType>
                        </xs:element>
                    </xs:sequence>
                </xs:complexType>
            </xs:element>
        </xs:sequence>
    </xs:complexType>
</xs:element>
<xs:element name="resource" minOccurs="0">
    <xs:complexType>
        <xs:all>
            <xs:element name="id"/>
            <xs:element name="resstrings">
                <xs:complexType>
                    <xs:all>
                        <xs:element name="name"/>
                        <xs:element name="value"/>
                    </xs:all>
                </xs:complexType>
            </xs:element>
        </xs:all>
    </xs:complexType>
</xs:element>
<xs:element name="versioninfo" minOccurs="0">
    <xs:complexType>
        <xs:all>
            <xs:element name="id"/>
```

-continued

```
                <xs:element name="apiversion">
                    <xs:annotation>
                        <xs:documentation>Version number of the client-server API issued by server</xs:documentation>
                    </xs:annotation>
                </xs:element>
                <xs:element name="buildnumber"/>
            </xs:all>
        </xs:complexType>
    </xs:element>
    <xs:element name="cmfolder" minOccurs="0">
        <xs:complexType>
            <xs:sequence>
                <xs:element name="id"/>
                <xs:element name="clientid"/>
                <xs:element name="path"/>
                <xs:element name="label"/>
                <xs:element name="cmfolder" minOccurs="0" maxOccurs="unbounded"/>
            </xs:sequence>
        </xs:complexType>
    </xs:element>
                </xs:choice>
            </xs:sequence>
        </xs:complexType>
    </xs:element>
            </xs:sequence>
        </xs:complexType>
    </xs:element>
    <xs:element ref="clientstate"/>
    <xs:element ref="serverstate"/>
  </xs:all>
</xs:complexType>
</xs:element>
```

Thus, communication between the browser client 200 and the business intelligence server 220 is an exchange of data and metadata at the XML level. The formatting of the information for presentation is responsibility of the browser client 200. There are two exceptions to this rule where the business intelligence server 220 provides preformatted data. The first is general graphics (such as icons) and the second is charts. The controls used to present data and metadata are rendered in the browser client 200 using the dynamic HTML capabilities of browsers.

The browser client 200 requests information from the business intelligence server 220 on demand from the user. In addition, it may request information in the background where it retrieves information prior to the user actually requesting it, e.g., to retrieve data for the columns and rows which are currently just off-screen based on the assumption that users will likely scroll there next.

This client/server system may support both server side and client side charting. The server side charting is done such that the business intelligence server 220 provides both an image and an XML document describing the contents of the image. The business intelligence server 220 does not provide the image and the dynamic processing code. In addition, the client side charting uses a plug-in technology. The client side charting support allows for a more dynamic and interactive experience for the user.

The business intelligence analysis client system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the business intelligence analysis client system are described separately, however, two or more elements may be provided as a single element, or one or more elements may be shared with other components in one or more computer systems.

What is claimed is:

1. A business intelligence analysis client system for use with a business intelligence analysis server system having an object model representing one or more data sources, the business intelligence analysis client system comprising:

an object model module comprising a copy of the object model of the business intelligence analysis server system, wherein the object model module is configured to manage the copy of the object model;

a user interaction module configured to receive a set of user gestures, convert the set of user gestures into a set of user requests, and present a set of results based on the set of user requests via a user interface, wherein the set of user requests comprises commands for the object model module; and a communication module configured to manage communication with the business intelligence analysis server system, wherein the communication comprises requests issued to and responses received from the business intelligence analysis server system, and wherein the communication module obtains information from the business intelligence analysis server system for updating the copy of the object model with the object model module.

2. The business intelligence analysis client system of claim 1, wherein the business intelligence analysis client system is in a web browser connected to a web server, wherein the web server communicates with the business intelligence analysis server system via a computer network.

3. The business intelligence analysis client system of claim 1, wherein the object model module incrementally updates the copy of the object model based on the responses received from the business intelligence analysis server system.

4. The business intelligence analysis client system of claim 1, wherein the communication managed by the communication module comprises asynchronous communication.

5. The business intelligence analysis client system of claim 1, wherein the object model module is configured to notify the user interaction module of changes in the copy of the object model, and wherein the user interaction module is configured to update the user interface in response to receiving the notification from the object model module.

6. The business intelligence analysis client system of claim 1, wherein the object model module is configured to convert the set of user requests into an Extensible Markup Language (XML) document, and wherein the communication module is configured to wrap the XML document into a Simple Object Access Protocol (SOAP) request.

7. The business intelligence analysis client system of claim 1, wherein the copy of the object model comprises a cache that stores a set of model objects, wherein the object model module is further configured to forward the set of commands to the business intelligence analysis server system if the cache does not include the set of results requested by the set of user requests.

8. The business intelligence analysis client system of claim 1, wherein the user interaction module is configured to present the results of the set of user requests via the user interface by being configured to render a set of business intelligence objects, wherein the set of business intelligence objects are based on the set of user requests.

9. The business intelligence analysis client system of claim 1, wherein the object model comprises a first set of model objects, wherein each model object of the first set of model objects is defined by a first definition, wherein the copy of the object model comprises a second set of model objects, wherein each model object of the second set of model objects is defined by a second definition, and wherein the first definition is the same as the second definition.

10. The business intelligence analysis client system of claim 9, wherein the responses received from the business intelligence analysis server system comprise a subset of the first set of model objects and a set of commands to modify the second set of model objects, wherein each command of the set of commands corresponds to one of the subset of model objects, wherein the communication module is further configured to parse the subset of model objects and direct each parsed model object of the subset of model objects and the command corresponding to the parsed model object to the one of the model objects of the second set of model objects having the same definition as the parsed model object, and wherein the object model module is configured to apply the command corresponding to the parsed model object to the model object of the second set of model objects having the same definition as the parsed model object.

11. The business intelligence analysis client system of claim 1, wherein the user interaction module is further configured to disable features in the user interface when the user interaction module determines that a user gesture involving a disabled feature will cause either the copy of the object model or the object model of the business intelligence analysis server system to enter an invalid state.

12. A method comprising:
receiving a set of user gestures via a business intelligence analysis client;
converting the set of user gestures into a set of user requests with the business intelligence analysis client, wherein the user requests comprise commands;
issuing a set of commands based on the set of user requests to a business intelligence analysis server with the business intelligence analysis client, wherein the set of commands directs the business intelligence analysis server to perform one or more actions on an object model maintained by the business intelligence analysis server and return a set of results to the business intelligence analysis client, wherein the object model represents one or more data sources, and wherein the one or more actions includes one or more of retrieving information from the one or more data sources and updating information stored within the one or more data sources;
updating a copy of the object model based on the set of results returned by the business intelligence analysis server; and
presenting the result of the set of user requests based on the updated copy of the object model.

13. The method of claim 12, further comprising providing the business intelligence analysis client in a web browser connected to a web server, wherein the web server communicates with the business intelligence analysis server via a computer network.

14. The method of claim 12, wherein updating step the copy of the object model further comprises incrementally updating the client copy of the object model based on the set of results returned by the business intelligence analysis server.

15. The method of claim 12, wherein the business intelligence analysis server returns the set of results asynchronously from issuing the set of commands based on the set of user requests with the business intelligence analysis client.

16. The method of claim 12, further comprising preventing user gestures that will result in issuing an invalid command to the business intelligence analysis server with the business intelligence analysis client, wherein the invalid command directs the business intelligence analysis server to perform one or more actions to the object model, wherein the one or more actions cause the object model to enter an invalid state.

17. The method of claim 12, further comprising:
converting the user request into an XML document, and
wrapping the XML document into a SOAP request for sending to the business intelligence analysis server.

18. The method of claim 12, wherein issuing the set of commands further comprises forwarding the discreet commands to the business intelligence analysis server in response to determining that the copy of the object model does not include the set of results requested by the user requests.

19. The method of claim 12, wherein presenting the result of the set of user requests comprises rendering a set of business intelligence objects, wherein the set of business intelligence objects are based on the set of user requests.

20. The method of claim 12, wherein the object model comprises a first set of model objects having a first definition, wherein the copy of the object model comprises a second set of model objects having a second definition, wherein the first definition is the same as the second definition.

21. The method of claim 20,
wherein the result of the set of user requests comprises a subset of the first set of model objects and a second set of commands to modify the second set of model objects,
wherein each command of the second set of commands corresponds to one or the subset of model objects, and
wherein updating the copy of the object model comprises parsing the subset of model objects and directing each parsed model object to the one of the model object of the second set of model objects having the same definition as the parsed model object and applying the command corresponding to the parsed model object to the model object of the second set of model objects having the same definition as the parsed model object.

22. A computer readable storage medium encoded with instructions for causing a programmable processor to:
receive a set of user gestures via a user interface of a business intelligence analysis client;
convert the set of user gestures into a set of user requests;
issue a set of commands based on the set of user requests to a business intelligence analysis server, wherein the set of commands directs the business intelligence analysis server to perform one or more actions on an object model maintained by the business intelligence analysis server and return a set of results, wherein the object model represents one or more data sources, and wherein the one or more actions includes one or more of retrieving information from the one or more data sources and updating information stored within the one or more data sources;
update a copy of the object model based on the set of results returned by the business intelligence analysis server; and
present the result of the set of user requests based on the updated copy of the object model via the user interface.

* * * * *